(12) United States Patent
Ohno et al.

(10) Patent No.: US 7,316,026 B2
(45) Date of Patent: Jan. 1, 2008

(54) RECEIVING APPARATUS AND RECEIVING METHOD, AND STORAGE MEDIUM

(75) Inventors: Tomoyuki Ohno, Kanagawa (JP); Teruki Kikkawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1171 days.

(21) Appl. No.: 10/355,105

(22) Filed: Jan. 31, 2003

(65) Prior Publication Data
US 2003/0149985 A1 Aug. 7, 2003

(30) Foreign Application Priority Data
Feb. 1, 2002 (JP) ............... 2002-025416

(51) Int. Cl.
  *G06F 3/00* (2006.01)
  *G06F 13/00* (2006.01)
  *H04N 5/445* (2006.01)
(52) U.S. Cl. ............... 725/58; 725/59; 386/95; 386/108; 386/38
(58) Field of Classification Search .......... 725/50
See application file for complete search history.

(56) References Cited

U.S. PATENT DOCUMENTS

| | | | |
|---|---|---|---|
| 5,734,589 A | 3/1998 | Kostreski et al. | 364/514 A |
| 5,801,787 A * | 9/1998 | Schein et al. | 725/43 |
| 6,078,594 A | 6/2000 | Anderson et al. | 370/498 |
| 6,118,498 A | 9/2000 | Reitmeier | 348/725 |

FOREIGN PATENT DOCUMENTS

| | | | |
|---|---|---|---|
| JP | 2001-86425 | | 3/2001 |
| WO | WO 00/01141 | * | 1/2000 |

* cited by examiner

Primary Examiner—Christopher Grant
Assistant Examiner—Shelton Austin
(74) Attorney, Agent, or Firm—Fitzpatrick, Cella, Harper & Scinto

(57) ABSTRACT

A signal receiving apparatus according to the present invention includes receiving unit for receiving a television broadcast, instruction unit for instructing change of a receiving channel of the receiving unit, and control unit for, in response to the instruction of channel change by the instruction unit, comparing an ending time of a program being broadcasted on a first channel which is being received by the receiving unit and an ending time of a program being broadcasted on a second channel after the change, and controlling a channel change operation of the receiving unit based on a result of the comparison.

19 Claims, 22 Drawing Sheets

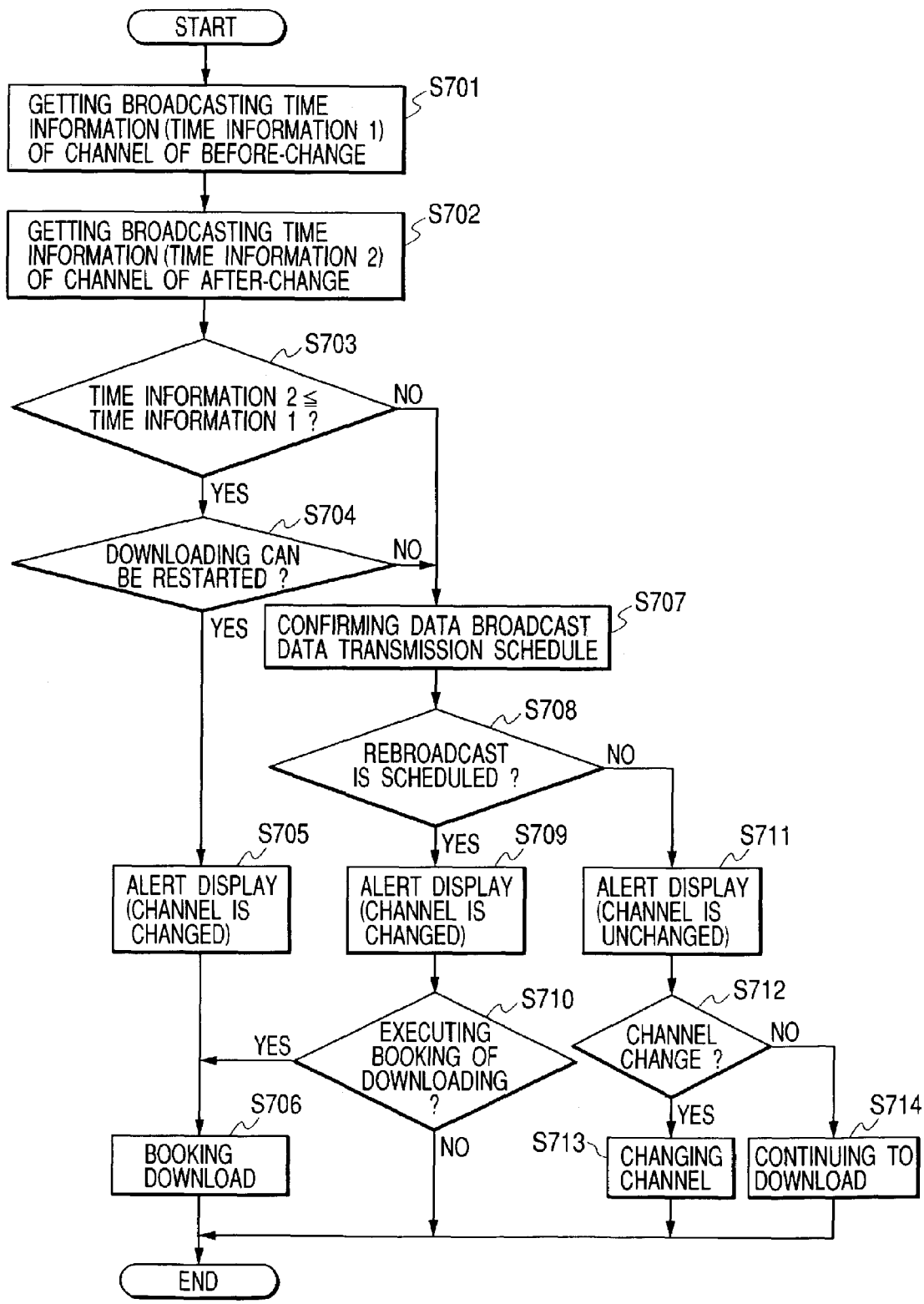

RECEIVING APPARATUS AND RECEIVING METHOD, AND STORAGE MEDIUM

BACKGROUND OF THE INVENTION

1. Field of the Invention

The present invention relates to a receiving apparatus, and in particular to control for changing a channel which is to be received.

2. Related Background Art

Currently, in the BS digital television broadcast, data broadcast is performed in addition to the ordinary television broadcast. According to the data broadcast, it is also possible to transmit texts, image information, or the like, which are required for program guides, shopping catalogues, electric books, electric albums, or the like, together with conventional television programs such as movies or dramas which are composed of pictures and voices.

Further, in addition to displaying the information according to the data broadcast on a television display screen, there has also been proposed a data broadcast application which allows a user to effectively utilize shopping catalogues, electric books, and electric albums by storing data broadcast contents in a television receiver or printing the same.

In the digital broadcast, data of plural channels (programs) is multiplexed on one transport stream (hereinafter referred to as TS) to be transmitted. In a receiver, a TS including data of a desired channel is selected out of a large number of TSs.

Therefore, while a television receiver is receiving a data broadcast channel included in a certain TS to store data broadcast contents thereof, if a user tries to change the channel to a channel included in a different TS, the user cannot help giving up downloading of data broadcast data which is now being downloaded.

SUMMARY OF THE INVENTION

The present invention has been devised under such a background, and it is an object of the present invention to provide a receiving apparatus which, even if an instruction to change a channel is received during downloading of television broadcast data, makes it possible to surely download the data which is being downloaded.

Under such an object, according to an aspect of the present invention, there is proposed a signal receiving apparatus, comprising:

receiving means for receiving a television broadcast;

instruction means for instructing change of a receiving channel of the receiving means; and control means for, in response to the instruction of channel change by the instruction means, comparing an ending time of a program broadcasted on a first channel which is currently being received by the receiving means and an ending time of a program broadcasted on a second channel after the channel change to control a channel change operation of the receiving means based on a result of the comparison.

Objects and features of the present invention other than those described above will be apparent from the following detailed description of embodiments of the present invention taken in conjunction with the accompanying drawings, in which like reference characters designate the same or similar parts throughout the figures thereof.

BRIEF DESCRIPTION OF THE DRAWINGS

FIG. 7 is a flow chart explaining operations at the time when a channel is changed;

DESCRIPTION OF THE PREFERRED EMBODIMENTS

Embodiments of the present invention will be hereinafter described in detail with reference to the accompanying drawings.

Figure 1:
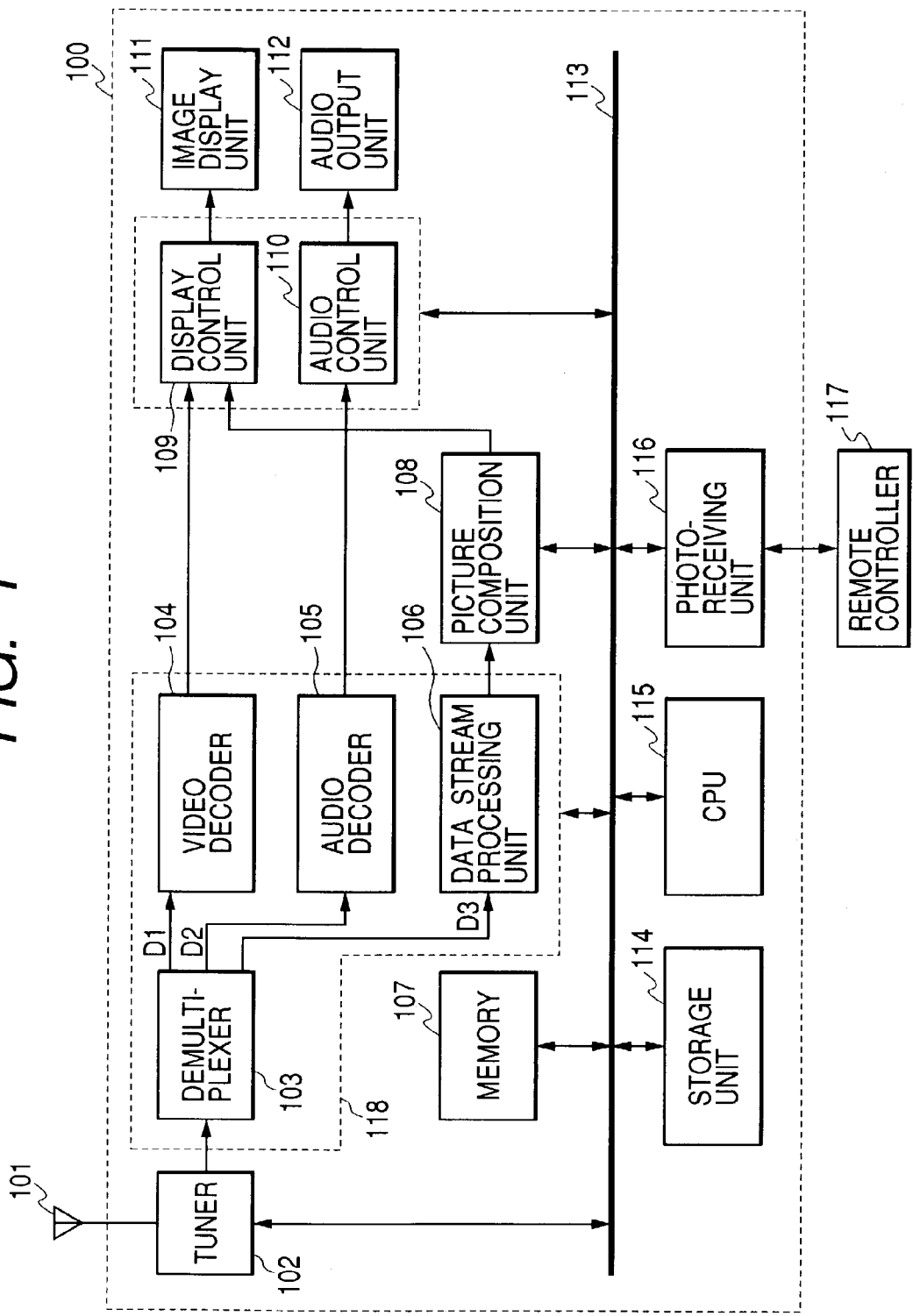
FIG. 1 is a block diagram showing a structure of a television receiver to which the present invention is applied.

FIG. 1 is a block diagram showing an overall structure of a digital television receiver 100 as a first embodiment of the present invention.

In FIG. 1, reference numeral 101 denotes an antenna; 102, a tuner; 103, a demultiplexer; 104, a video decoder; 105, an audio decoder; and 106, a data stream processing unit. A signal processing unit 118 is constituted by the demultiplexer 103, the video decoder 104, the audio decoder 105, and the data stream processing unit 106. In addition, reference numeral 107 denotes a memory; 108, a picture composing unit; 109, a display control unit; 110, an audio control unit; 111, an image display unit; 112, an audio output unit; 113, a system bus; 114, a storage unit; 115, a CPU; 116, a photo-receiving unit; and 117, a remote controller.

In the digital television receiver (hereinafter referred to as receiver) 100, a signal received by the antenna 101 is inputted in the tuner 102. The tuner 102 applies processing such as demodulation and error correction to the inputted signal, and generates a transport stream (TS) to output it to the demultiplexer 103.

The demultiplexer 103 extracts video data, audio data, EPG (Electronic Program Guide) data, and data broadcast data of a channel which is selected by the operation of the remote controller 117 via the photo-receiving unit 116, from the inputted TS in which video data, audio data, EPG data, data broadcast data, and the like for plural channels are multiplexed.

Figure 2:
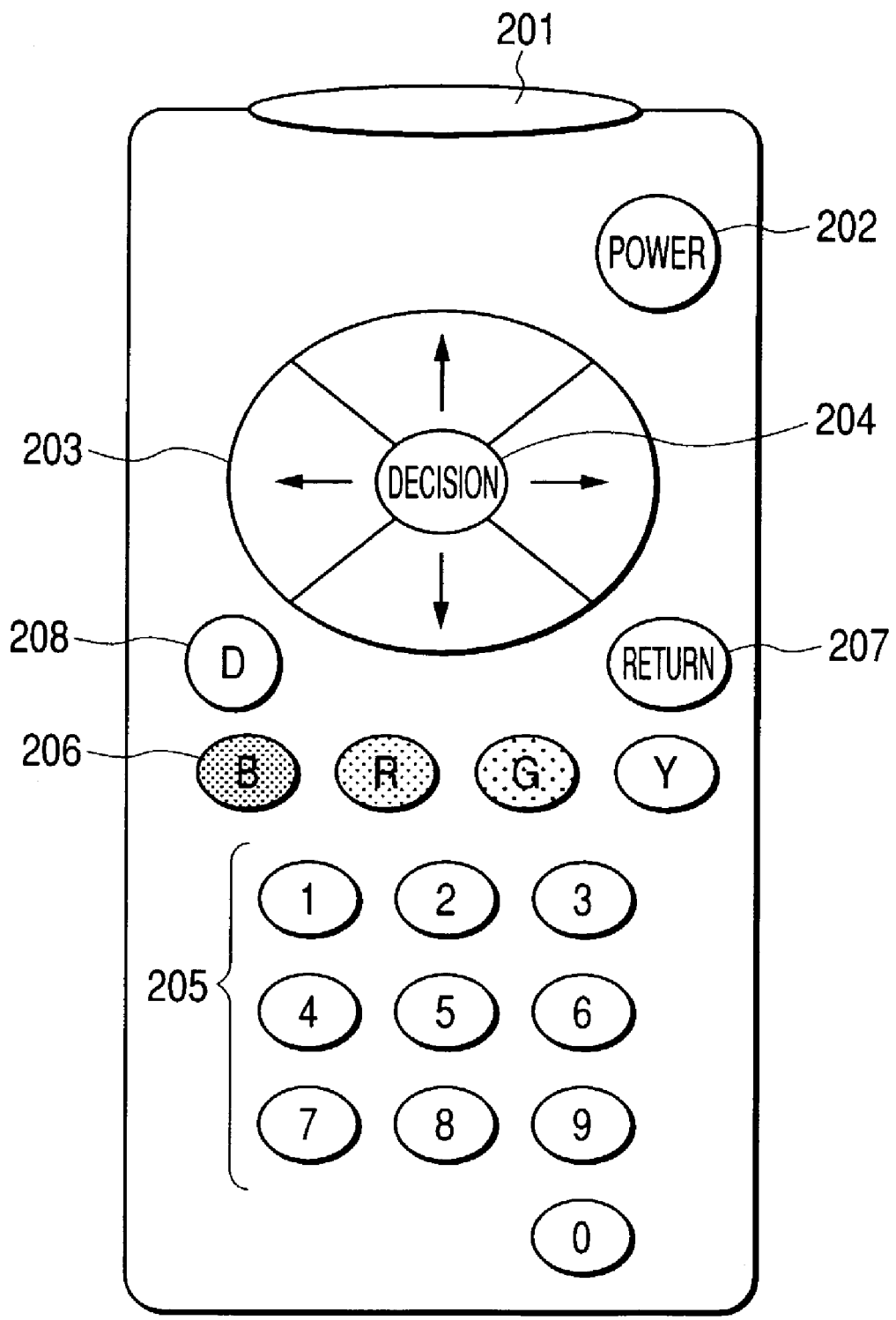
FIG. 2 illustrates a structure of a remote controller.

FIG. 2 shows an example of the remote controller 117 of FIG. 1. In FIG. 2, reference numeral 201 denotes a remote controller light emitting section; 202, a power key; 203, a cursor key; 204, a decision key; 205, a ten key; 206, color keys; and 207, a return key. A user can instruct screen operations and change of channels as described later by operating these operation keys.

Figure 3:
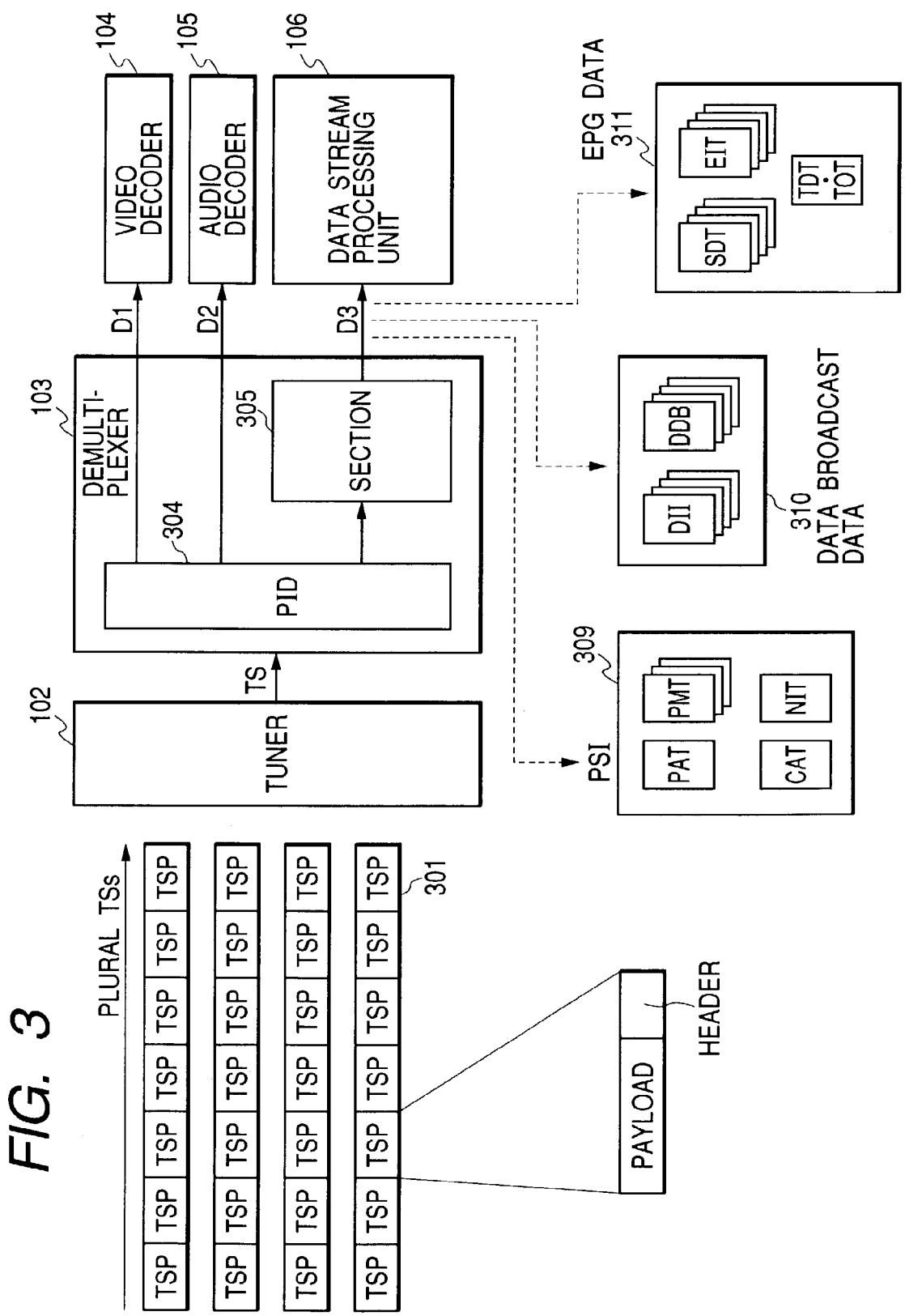
FIG. 3 is a diagram for explaining a receiving operation of a digital television broadcast.

An operation at the time when data of a desired channel is extracted from one TS will be described with reference to FIG. 3. FIG. 3 is a diagram explaining the case in which video data, audio data, EPG data, data broadcast data, and the like of a desired channel are extracted from TS data.

In FIG. 3, reference numeral 301 denotes a transport stream (TS); 102, a tuner; 103, a demultiplexer; 304, a Packet Identifier (PID) filter; 305, a section filter; 104, a video decoder; 105, an audio decoder; 106, a data stream processing unit; 309, Program Specific Information (PSI); 310, data broadcast data; and 311, Electronic Program Guide (EPG) data. Elements denoted by the same reference numerals as those in FIG. 1 have the equivalent functions.

In the TS 301 of FIG. 3, video data, audio data, data broadcast data, and EPG data for plural channels are multiplexed in a time division manner. In addition, in plural TSs shown in FIG. 3, data of channels different from one another to be transmitted from not-shown broadcast stations are multiplexed in a time division manner.

In the receiver 100, the tuner 102 shown in FIG. 3 receives and demodulates a television broadcast, and selects one TS including data of a desired channel to transmit it to the demultiplexer 103. As shown in FIG. 3, each TS is transmitted by a unit of Transport Stream Packet (TSP), and a PID for identifying a type of each TSP is given to a header of the TSP. The demultiplexer 103 uses the PID filter 304 and the section filter 305 to extract the PSI 309 located in a payload portion of a TSP having a PID of a predetermined value and transmits the extracted PSI to the data stream processing unit 106.

The PSI 309 defines contents of the entire TS, and includes a Program Association Table (PAT), a Program Map Table (PMT), a Conditional Access Table (CAT), and a Network Information Table (NIT) which are standardized by the IEC/ISO13818-1, the Association of Radio Industries and Businesses (ARIB), or the like. The demultiplexer 103 uses the PSI 309 to extract video data D1 and audio data D2 using the ID filter 304 and transmits the extracted data to the video decoder 104 and the audio decoder 105, respectively.

The demultiplexer 103 likewise extracts the data broadcast data 310 and the EPG data 311 and transmits the extracted data to the data stream processing unit 106. The data broadcast data 310 includes a Download Info Indication (DII) and a Download Data Block (DDB) which are standardized by the IEC/ISO13818-6, the ARIB, or the like. The EPG data 311 includes a Service Description Table (SDT) and an Event Information Table (EIT) which are standardized by the Digital Video Broadcast (DVB), the ARIB, or the like.

The video data D1 will be hereinafter described. The video decoder 104 applies decode processing of the MPEG to vide data inputted from the demultiplexer 103 and outputs decoded video data to the display control unit 109. The display control unit 109 changes or multiplexes pictures according to an operation of the video decoder 104 or the remote controller 117 to display the pictures on the image display unit 111.

Next, the audio data D2 will be described. The audio decoder 105 applies decode processing of the MPEG to the audio data D2 inputted from the demultiplexer 103 and outputs decoded audio data to the audio control unit 110. The audio control unit 110 applies processing of D/A conversion to the audio data inputted from the audio decoder 105 and outputs the audio data to the audio output unit 112. In addition, the audio output unit 112 includes input terminals for an amplifier and a speaker and an audio input terminal which are not shown in the figure.

Next, incidental information concerning EPG data and data broadcast data will be described.

EPG data is transmitted in data structure prescribed in the standard "Program Array Information to be used in Digital Broadcast", or the like in the ARIB. As main constitutional data, there are a Time Description Table (TDT) or a Time Offset Table (TOT) for transmitting present time information, a Service Description Table (SDT) for transmitting information concerning an organized channel such as a name of the organized channel and a name of a broadcast carrier, an Event Information Table (EIT) for transmitting information concerning a program such as a name of the program, a broadcast starting date and time, a broadcast duration and explanation of program contents, and the like. In addition, it is a general practice to use the information of the TDT or the TOT for clock display of the receiver 100, time management for program booking, or the like. Further, as the information of the EIT, data for approximately one week is obtained in advance and stored in the memory 107.

Data broadcast data is transmitted repeatedly from a broadcasting station according to a data carousel system of DSM-CC prescribed and described in the ISO/IEC13818-6, a technical material "BS Digital Broadcast Operation Regulations" in the ARIB, and the like. Text information, script information, image information, video and audio data are included in data broadcast data obtained by the demultiplexer 103. These are described according to an extensible Markup Language (XML) prescribed by W3C or syntax following the XML.

Figure 4:
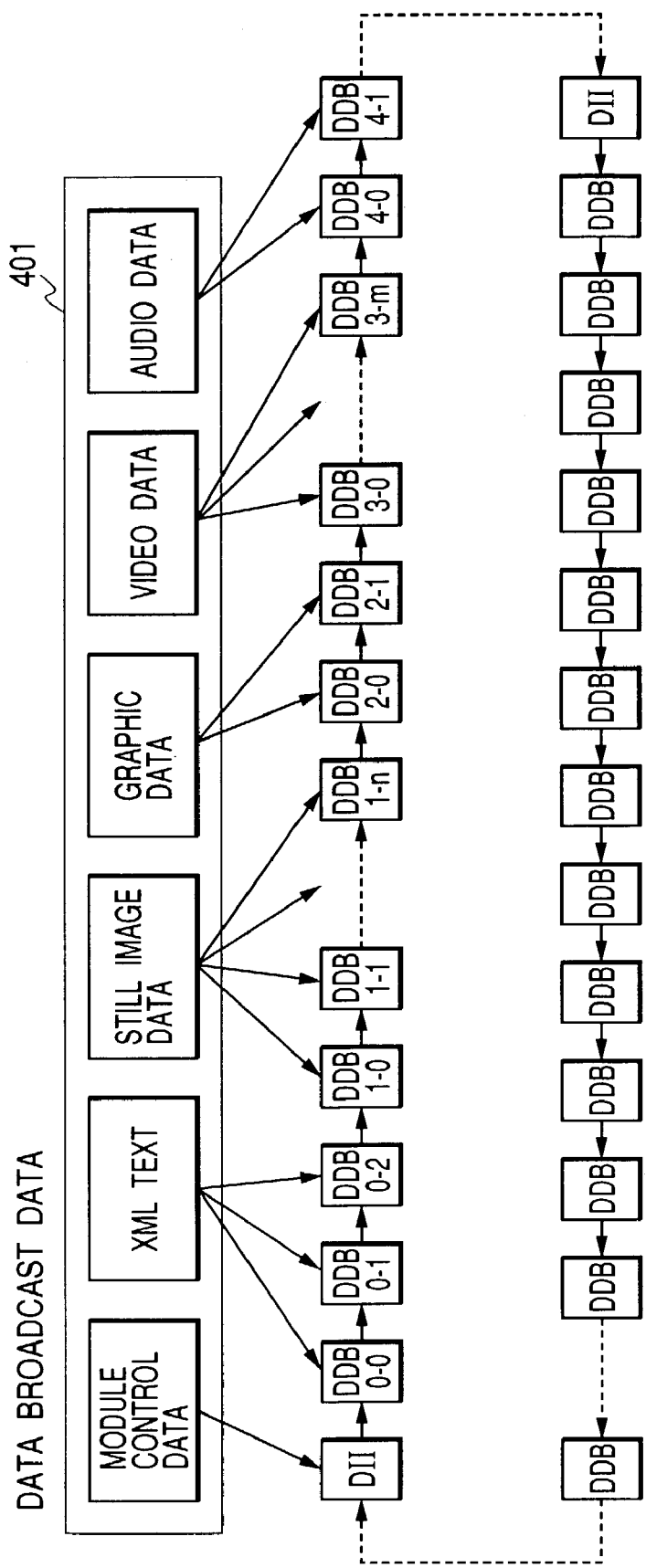
FIG. 4 illustrates a state of data broadcast data.

FIG. 4 shows a conceptual diagram of data broadcast data to be transmitted according to the data carousel transmission system. As shown in 401 of FIG. 4, the data broadcast data is constituted by module control data, XML text data, still image data which is image information, graphic data, video data, and audio data. Each data is divided into a DII or a plurality of DDB sections and multiplexed repeatedly in a TS for each certain period.

For example, in FIG. 4, the control data in the data broadcast data 401 is divided into DII, whereas the XML text data is divided into three DDB sections, DDB0-0 to DDB0-2. Likewise, as shown in FIG. 4, the still image data is divided into n+1 DDB sections, DDB1-0 to DDB1-n, the graphic data is divided into two DDB sections, DDB2-0 to DDB2-1, the-video data is divided into m+1 DDB sections, DDB3-0 to DDB3-m, and the audio data is divided into two DDB sections, DDB4-0 to DDB4-1.

Figure 5A:
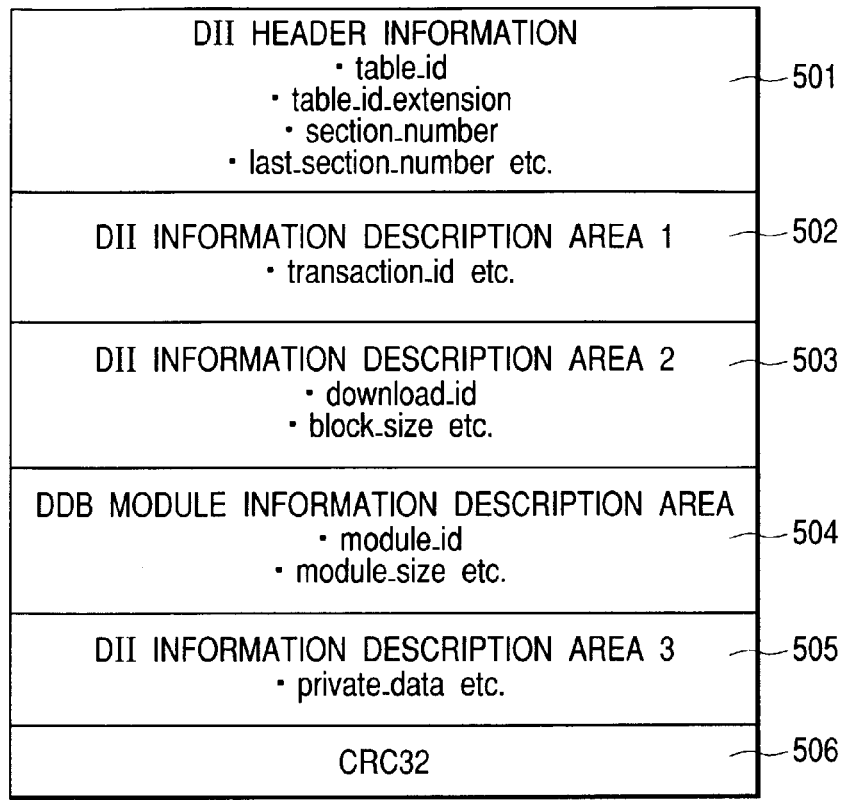
FIGS. 5A and 5B illustrate structures of EIT data in accordance with a first embodiment of the present invention.
Figure 5B:
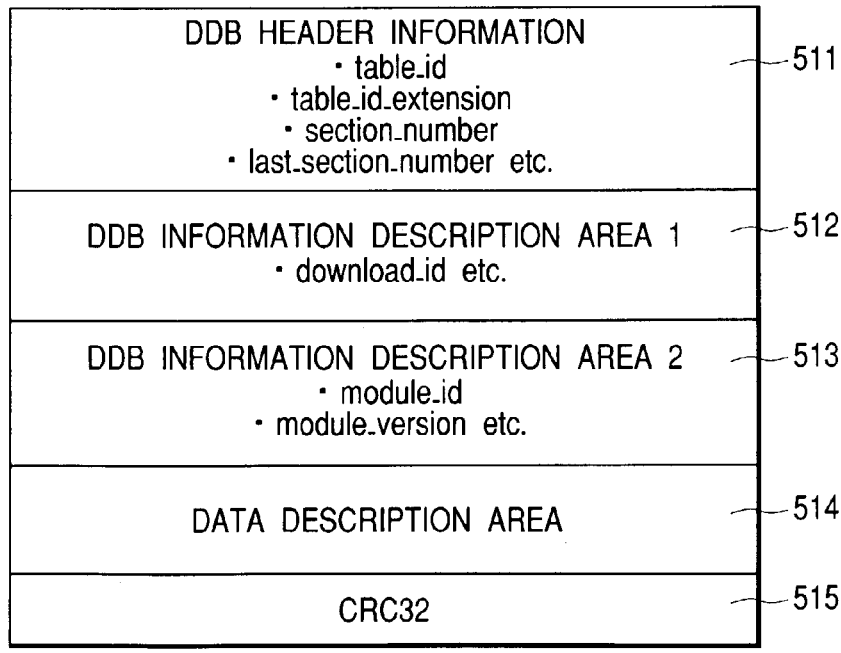

FIG. 5A shows an example (extract) of data structure of the DII. FIG. 5B shows an example (extract) of data structure of the DDB. In areas 501 to 506 in FIG. 5A, contents prescribed and described in the technical material "BS Digital Broadcast Operation Regulations", or the like in the ARIB are described, respectively. In addition, in areas 511 to 515 in FIG. 5B, contents prescribed and described in the technical material "BS Digital Broadcast Operation Regulations", or the like in the ARIB are described, respectively.

The data broadcast data transmitted in this way is outputted to the storage unit 114 via the demultiplexer 103 and the data stream processing unit 106 and stored therein.

In the case in which the CPU 115 receives a data broadcast display instruction from the remote controller 117 via the photo-receiving unit 116, the CPU 115 reads out desired data broadcast data from the storage unit 114, decodes the data broadcast data utilizing the memory 107 and the data stream processing unit 106 to output the decoded data to the picture composing unit 108, and composes data for picture display.

The picture composing unit 108 outputs a video signal which is based on the data for picture display to the display control unit 109. As described above, the display control unit 109 outputs a video signal to the image display unit 111 in order to perform change-over, composite display, or the like of a composed video picture and a data broadcast screen.

Next, operations in the case in which an instruction to change a channel is sent by a user during downloading (storage) of data broadcast data will be described.

Figure 6:
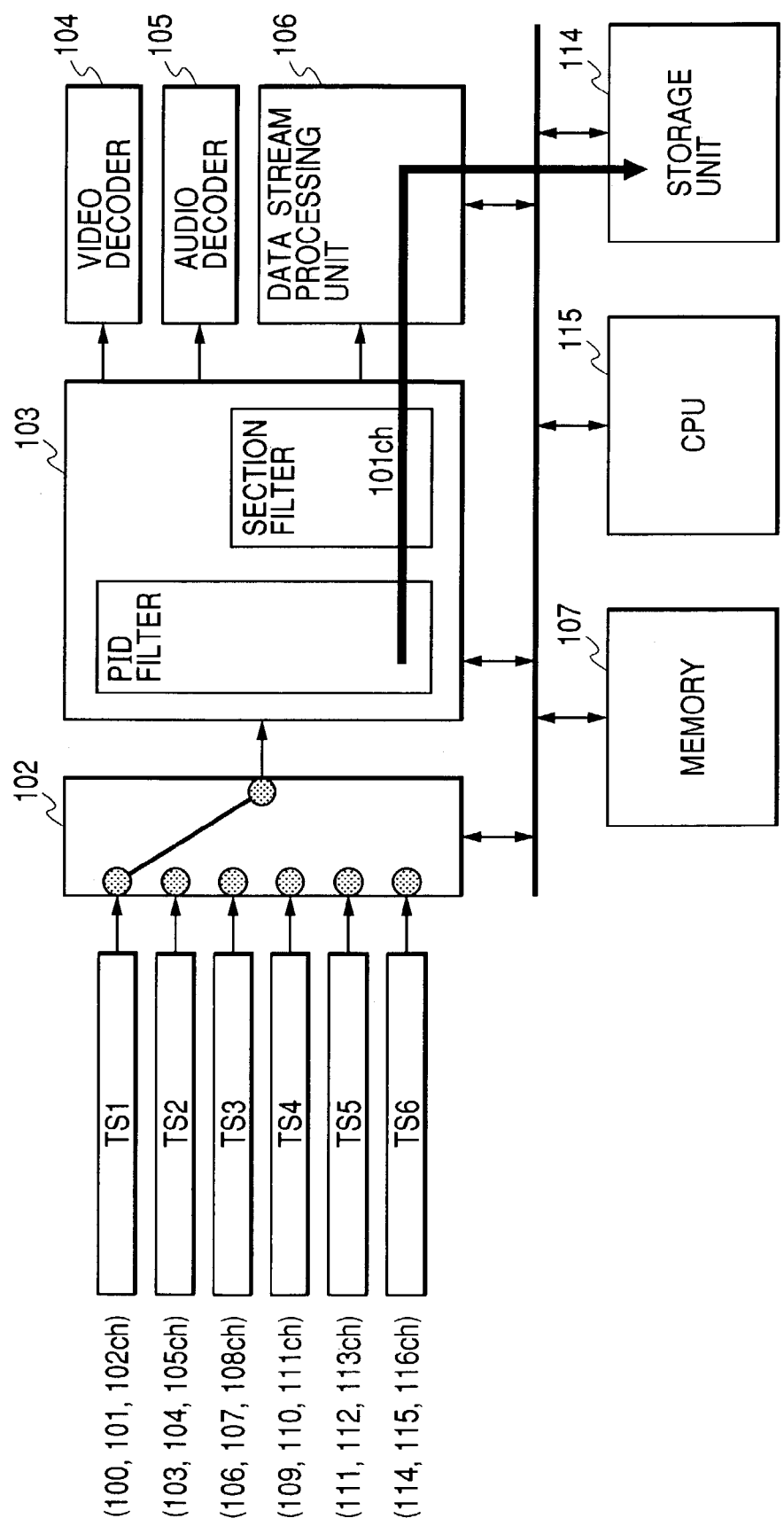
FIG. 6 illustrates an operation for receiving a digital television broadcast.

FIG. 6 is a diagram showing a structure of a main part of the receiver 100 for explaining operations of the receiver 100 at the time of this channel change. Components which are the same as those in FIGS. 1 and 3 are denoted by the identical reference numerals.

In FIG. 6, six TSs are transmitted by television carrier waves of different frequencies, respectively, from a not-shown broadcasting station. These TSs are referred to as TS1 to TS6, respectively. As shown in the figure, data of 100ch, 101ch, and 102ch are multiplexed on the TS1, data of 103ch, 104ch, and 105ch are multiplexed on the TS2, and data of 106ch, 107ch, and 108ch are multiplexed on the TS3. In this way, television programs or data broadcast data for three channels are multiplexed on each TS up to the TS6 as shown in FIG. 6.

At present, the TS1 is being received in the tuner 102. Moreover, data broadcast data of 101ch is selected from the TS1 in the demultiplexer 103 and stored in the storage unit 114 via the data stream processing unit 106.

The CPU 115 stores and manages elapsed time since downloading of data broadcast data is started and a downloaded data amount, and information on a DII and DDB sections which are now being downloaded and scheduled to be downloaded (contents described in FIGS. 5A and 5B), in particular, the number of sections of the downloaded DDB and parameters module_id and section_no of the sections. It is possible to calculate a bit rate value at the time of downloading the data broadcast data from the elapsed time since downloading of the data broadcast data is started and the downloaded data amount.

Operations of the CPU 115 in the case in which a request for change from the above-described downloading state of 101ch to 106ch, which is a channel included in the TS3 other than TS1, is received will be hereinafter described with reference to FIGS. 7, 8A, 8B and 8C. FIG. 7 is a flow chart showing the operations of the CPU 115.

When channel change is requested by a user operation, first, in step S701, the CPU 115 gets broadcasting time information of data broadcast data being broadcasted in 101ch which is a channel now being received (channel before-change), from the EIT stored in the memory 107.

Next, in step S702, the CPU 115 likewise gets broadcasting time information of a program being broadcasted in 106ch which is a channel after-change. The broadcasting time information which the CPU 115 gets in steps S701 and S702 refers to a broadcast starting time and a broadcast duration.

Next, in step S703, the CPU 115 calculates ending times of the respective broadcasts and judges which of the broadcasts ends earlier according to the information on the broadcast starting time and the broadcast duration which the CPU 115 gets in steps S701 and S702.

Figure 8A:
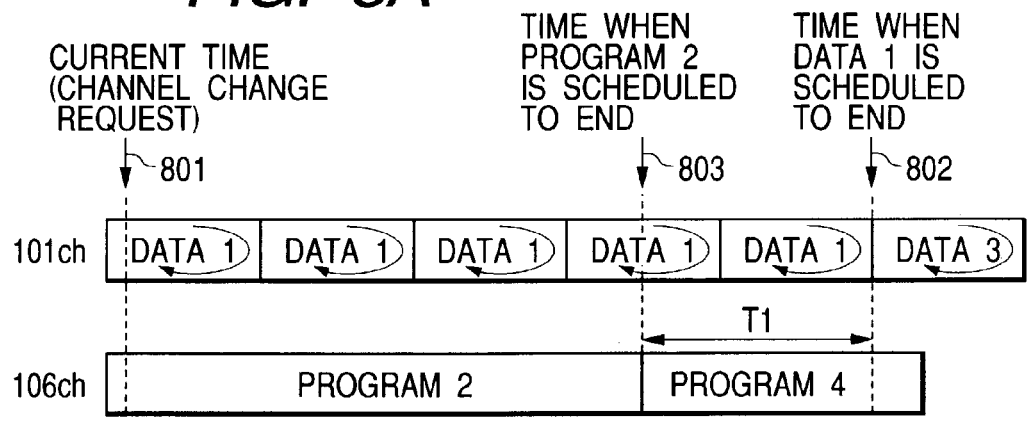
FIGS. 8A, 8B, and 8C are timing charts showing operation timing for changing a channel.
Figure 8B:
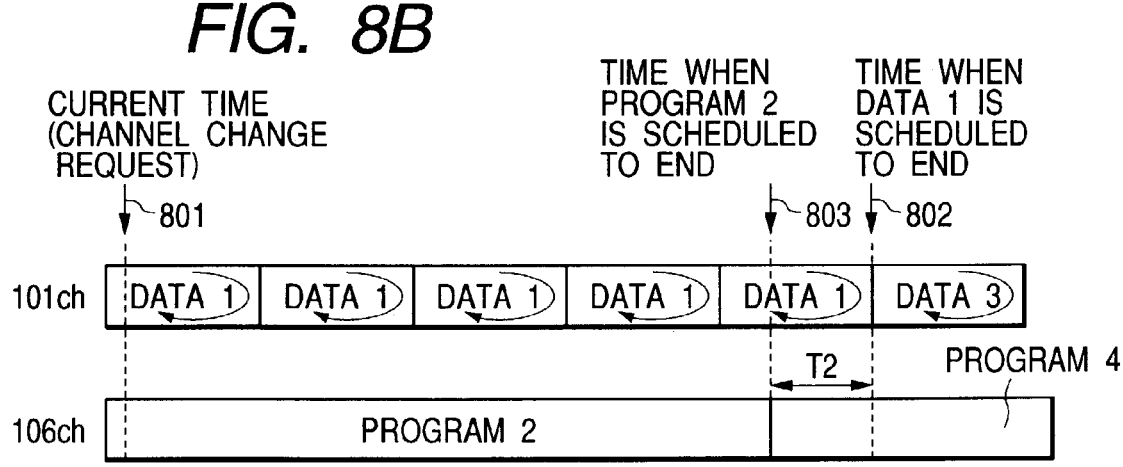

As an example, in the case in which a broadcast ending time 803 of the channel after-change 106ch is earlier than a broadcast ending time 802 of the channel before-change 101ch as shown in FIGS. 8A and 8B, the CPU 115 proceeds to step S704.

FIG. 8A indicates that data broadcast data called "data 1" which is being downloaded in 101ch is repeatedly transmitted, a program called "program 2" is broadcasted in 106ch, and a time when the "program 2" is scheduled to end (point denoted by 803 in the figure) is earlier than a time when the broadcast of the "data 1" is scheduled to end (point denoted by 802 in the figure) by time Ti which is equal to or longer than one transmission period of the "data 1".

FIG. 8B indicates that data broadcast data called "data 1" which is being downloaded in 101ch is repeatedly transmitted, a program called "program 2" is broadcasted in 106ch, and a time when the "program 2" is scheduled to end is earlier than a time when the broadcast of the "data 1" is scheduled to end by time T2 which is equal to or shorter than one transmission period of the "data 1".

Figure 8C:
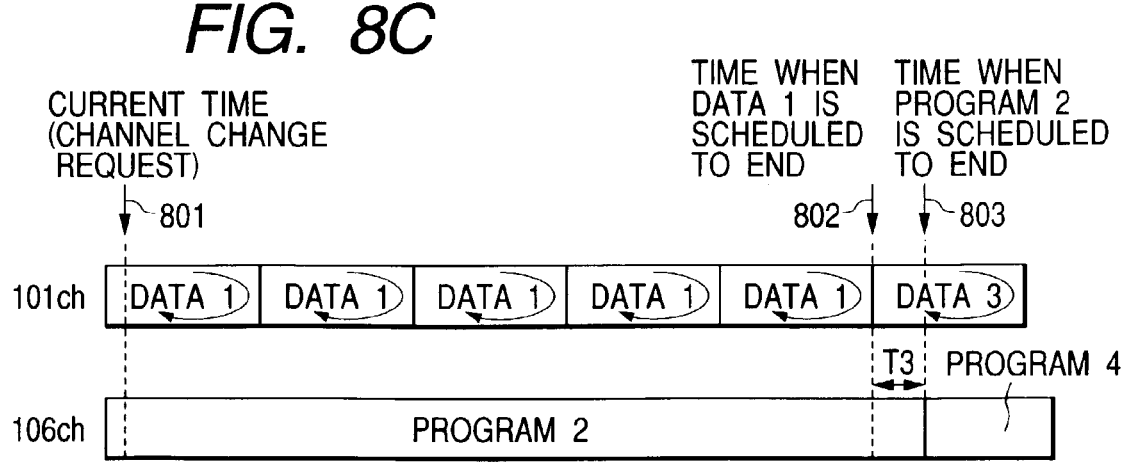

Further, in the case in which a broadcast ending time of the channel after-change 106ch is later than a broadcast ending time of the channel before-change 101ch as shown in FIG. 8C, the processing proceeds to step S707.

FIG. 8C indicates that data broadcast data called "data 1" which is being downloaded in 101ch is repeatedly transmitted, a program called "program 2" is broadcasted in 106ch, and a time when the broadcast of "data 1" is scheduled to end is earlier than a time when the "program 2" is scheduled to end by time T3.

In step S704, after the "program 2" of the channel after-change 106ch ends, the CPU 115 returns the channel to the channel before-change 101ch and judges if downloading can be restarted. A flow of the judgment is shown in FIG. 9.

Figure 9:
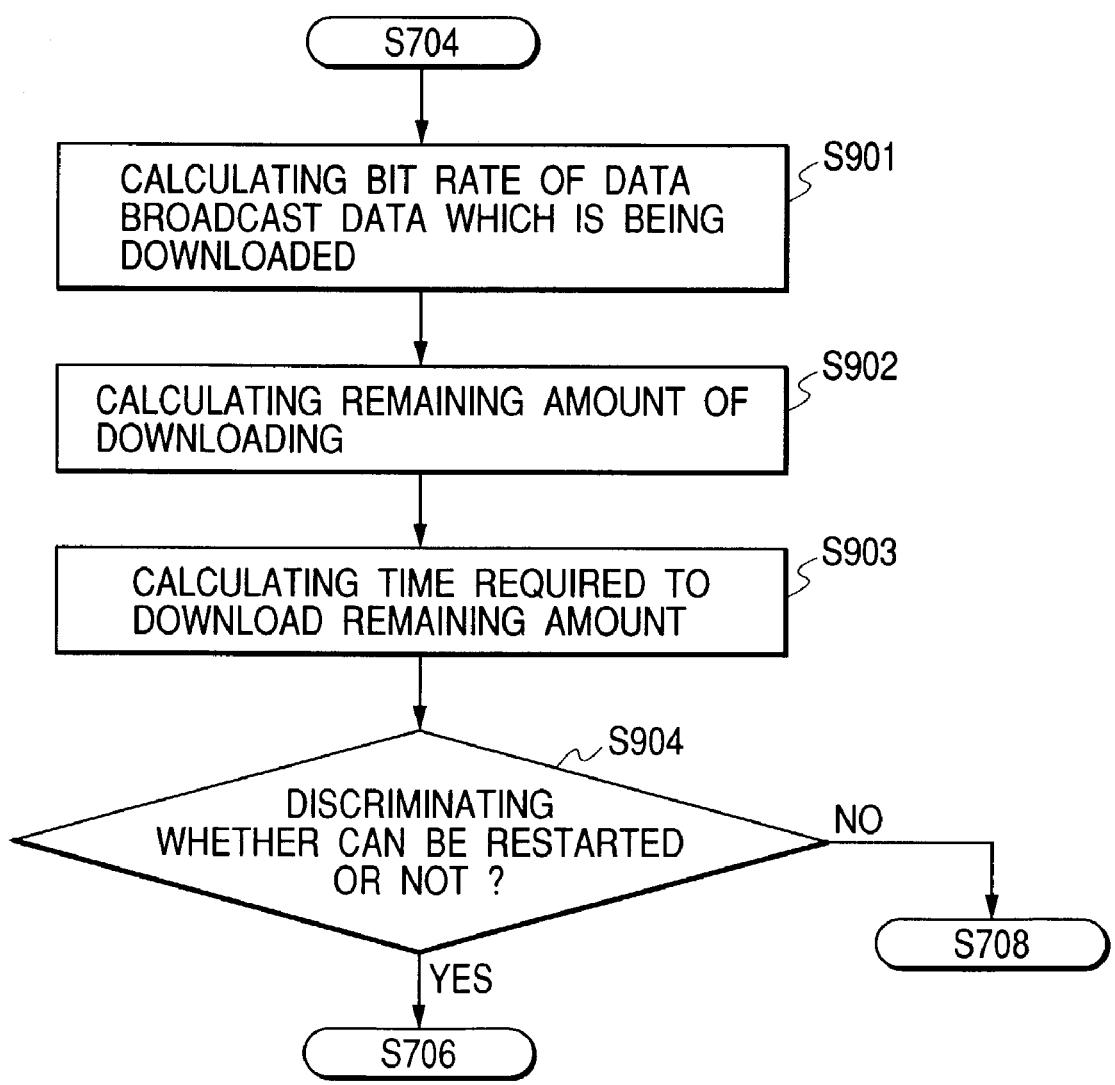
FIG. 9 is a flow chart explaining an operation for booking downloading.

In step S901 of FIG. 9, the CPU 115 calculates a bit rate value of data broadcast data which is being downloaded, from the elapsed time since downloading of the data broadcast data managed in the CPU 115 is started and the downloaded data amount. This bit rate value can be calculated according to the expression "bit rate value=downloaded data amount/elapsed time since downloading is started".

Next, in step S902, the CPU 115 calculates a remaining amount value of downloading of data not downloaded yet from the total amount of download data and the downloaded data amount managed in the CPU 115. This remaining amount of downloading can be calculated according to the expression "remaining amount of downloading=total amount of download data—downloaded data amount".

Next, in step S903, the CPU 115 calculates time required to download remaining data (time required to download remaining amount), from the respective values calculated in steps S901 and S902. This required time can be calculated according to the expression "time required to download remaining amount=remaining amount of downloading/bit rate value".

Then, in step S904, the CPU 115 compares T1 or T2 of FIGS. 8A to 8C, which is a difference between the broadcast ending time of the "data 1" and the broadcast ending time of the "program 2", with the "time required to download remaining amount", thereby judging whether downloading can be restarted.

In the case of FIG. 8A, since the time T1 is longer than the "time required to download remaining amount", the CPU 115 judges that downloading can be restarted and proceeds to step S705. In addition, in the case of FIG. 8B, since the time T2 is shorter than the "time required to download remaining amount", the CPU 115 judges that it is difficult to restart downloading and proceeds to step S707.

Figure 10:
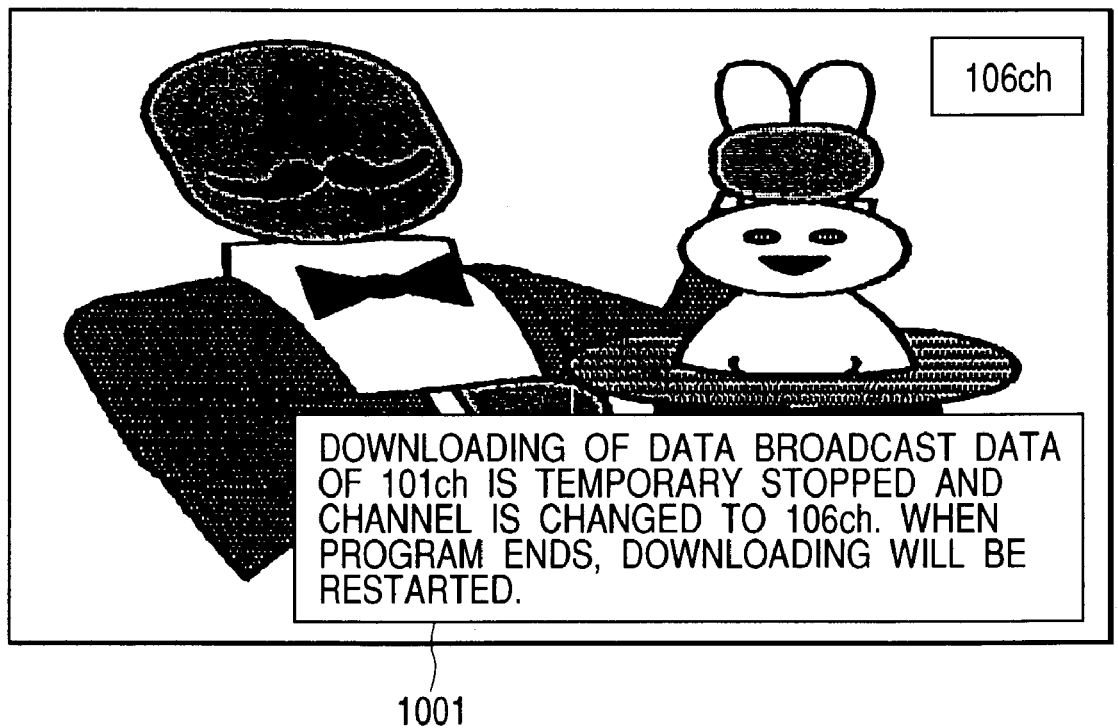
FIG. 10 illustrates an alert picture.

In the case in which the CPU 115 judges in step S704 that downloading can be restarted later even if a channel is changed, in step S705, the CPU 115 changes a receiving channel to 106ch designated by the user and, at the same time, displays an alert picture 1001 as shown in FIG. 10 on the display screen.

Then, in step S706, the CPU 115 performs a booking operation for restarting downloading of the "data 1" being broadcasted on 101ch after the "program 2" being broadcasted on 106ch ends, and finishes the channel change operation. The booking operation for restarting downloading will be described later.

On the other hand, in the case in which the CPU 115 judges in step S704 that it is difficult to restart downloading, in step S707, the CPU 115 confirms a schedule of retransmission (rebroadcast) of data broadcast data which is now being downloaded.

Figure 11:
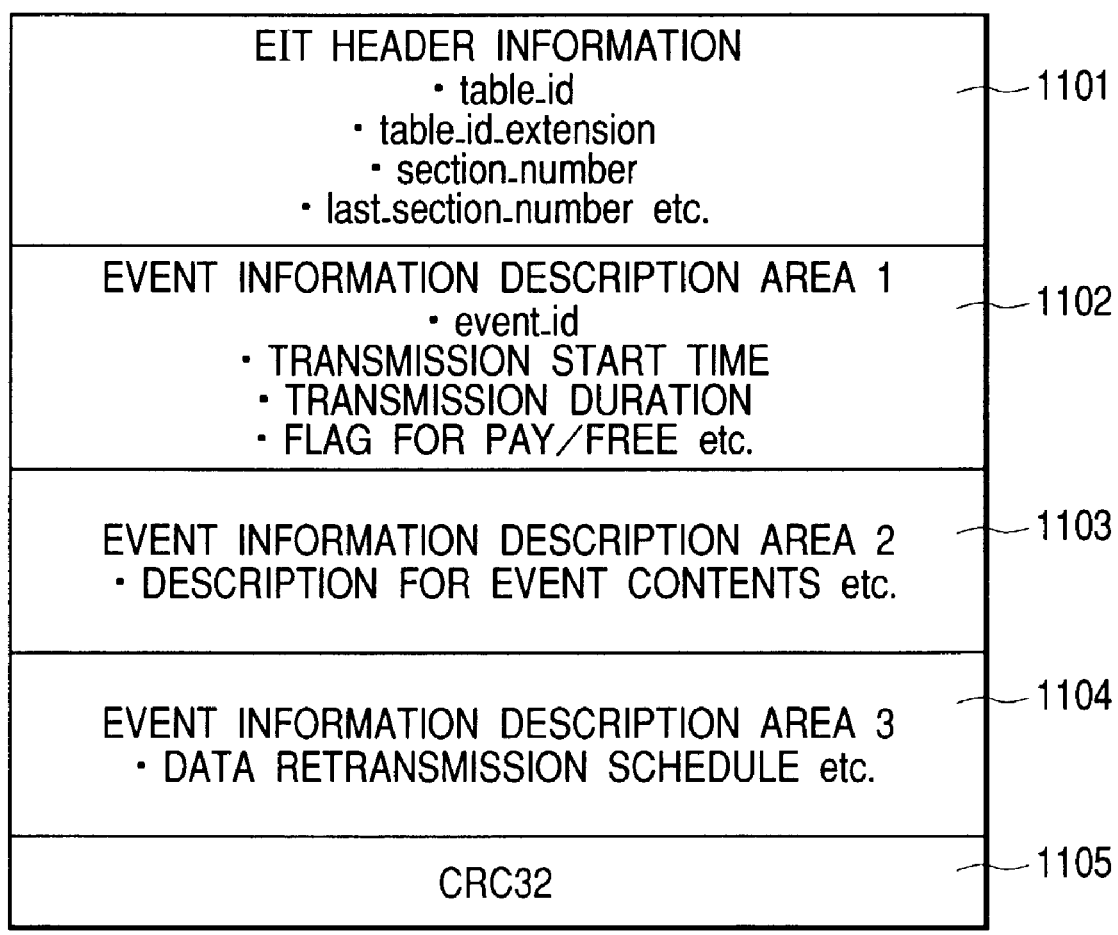
FIG. 11 illustrates a structure of EIT data in accordance with the first embodiment of the present invention.

FIG. 11 shows an example (extract) of a data structure of the EIT indicating a retransmission schedule of broadcast data used in this embodiment. In areas 1101 to 1103 and 1105 of FIG. 11, contents prescribed in the standard "Program Array Information to be used in Digital Broadcast", or the like in the ARIB are described, respectively. In an area 1104, retransmission schedule information of an event (data broadcast data) described in this EIT is described. The retransmission schedule information in this context is assumed to include a date and time when transmission is started, a duration, a number of channel to be retransmitted, and a Packet Identifier (PID).

In step S708, the CPU 115 confirms whether or not rebroadcast is scheduled based on a result of confirmation of this transmission schedule. That is, the CPU 115 judges that retransmission is scheduled if there is a description in the event information description area 1104 and judges that retransmission is not scheduled if there is no description in the event information description area. The CPU 115 proceeds to step S709 if retransmission is scheduled and proceeds to step S711 if retransmission is not scheduled.

Figure 12:
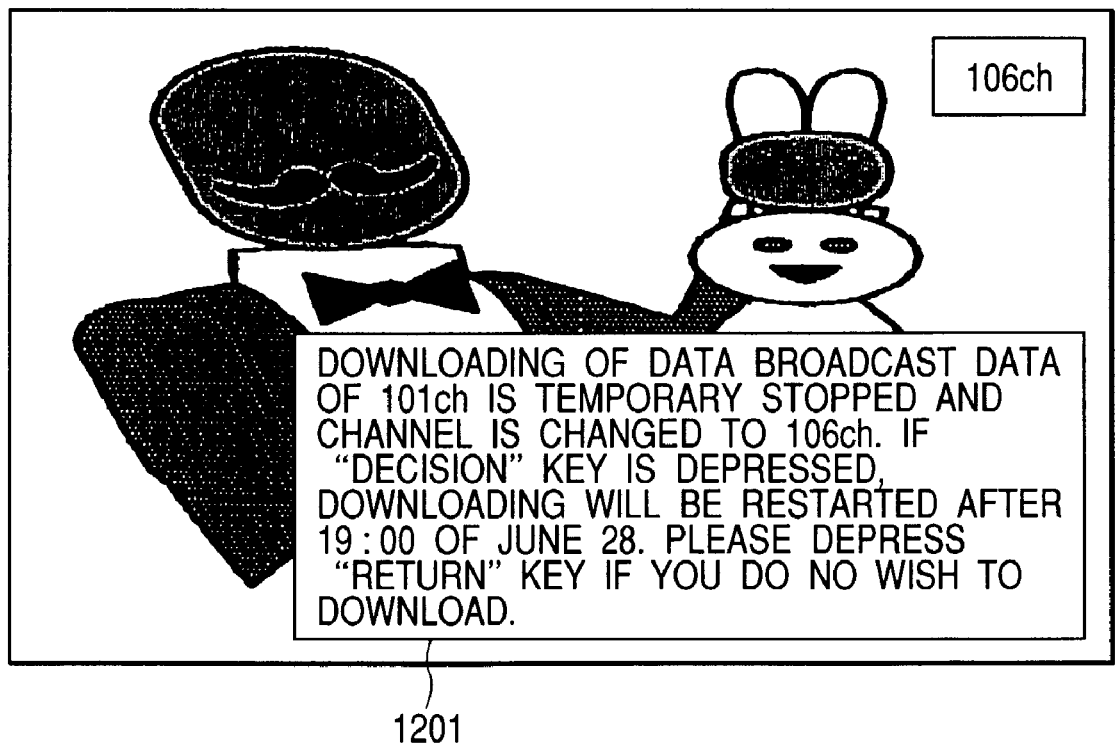
FIG. 12 illustrates an alert picture.

In step S709, the CPU 115 changes the program to a program of 106ch designated by the user because it judges that retransmission is scheduled and, at the same time, displays an alert picture 1201 as shown in FIG. 12 on the image display unit 111.

Then, in step S710, the CPU 115 waits for the user's judgment on whether or not booking for restarting downloading in accordance with the description of the event information description area 1104 is performed. The user can confirm the display screen of FIG. 12 and designate with the remote controller 117 whether or not booking for restarting downloading is performed. If a decision key 1404 of the remote controller 117 is operated, the CPU 115 proceeds to step S706 and books restart of downloading to finish the channel change operation. In addition, if a return key 1407 of the remote controller 117 is operated, the CPU 115 finishes the channel change operation without performing booking for restarting downloading.

Figure 13:
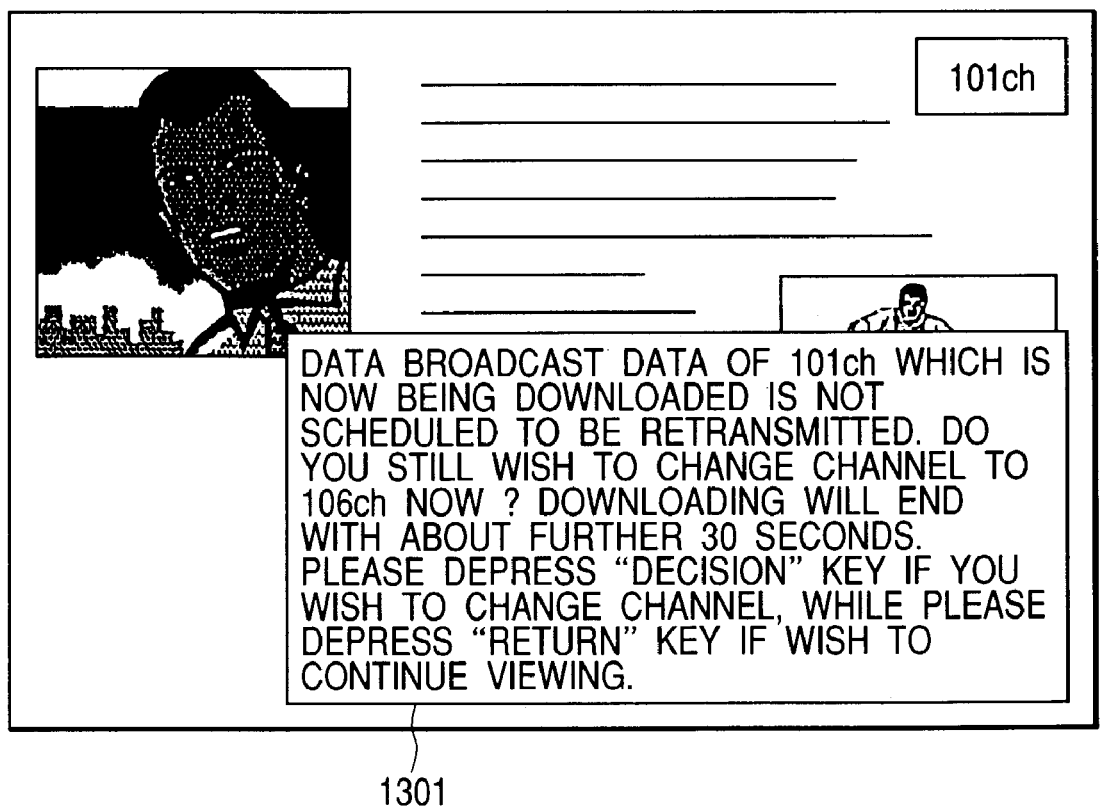
FIG. 13 illustrates an alert picture.

In addition, since the CPU 115 judges that retransmission of data broadcast data which is being downloaded is not scheduled, in step S711, the CPU 115 displays an alert picture 1301 as shown in FIG. 13 on the image display unit 111 without changing a channel to 106ch designated by the user.

Then, in step S712, the CPU 115 waits for the user's instruction as to whether or not channel change is performed. The user can confirm the display screen of FIG. 13 and designate with the remote controller 117 whether or not booking for restarting downloading is performed. If the decision key 1404 of the remote controller 117 is operated by the user, the CPU 115 proceeds to step S713 and changes a channel to 106ch to finish the channel change operation. In addition, if a return key 1407 of the remote controller 117 is operated by the user, the CPU 115 continues downloading of data broadcast which is being transmitted by 101ch without changing a channel and finishes the channel change operation.

Next, a booking operation for restarting downloading will be described with reference to FIGS. 14 and 15.

Figure 14:
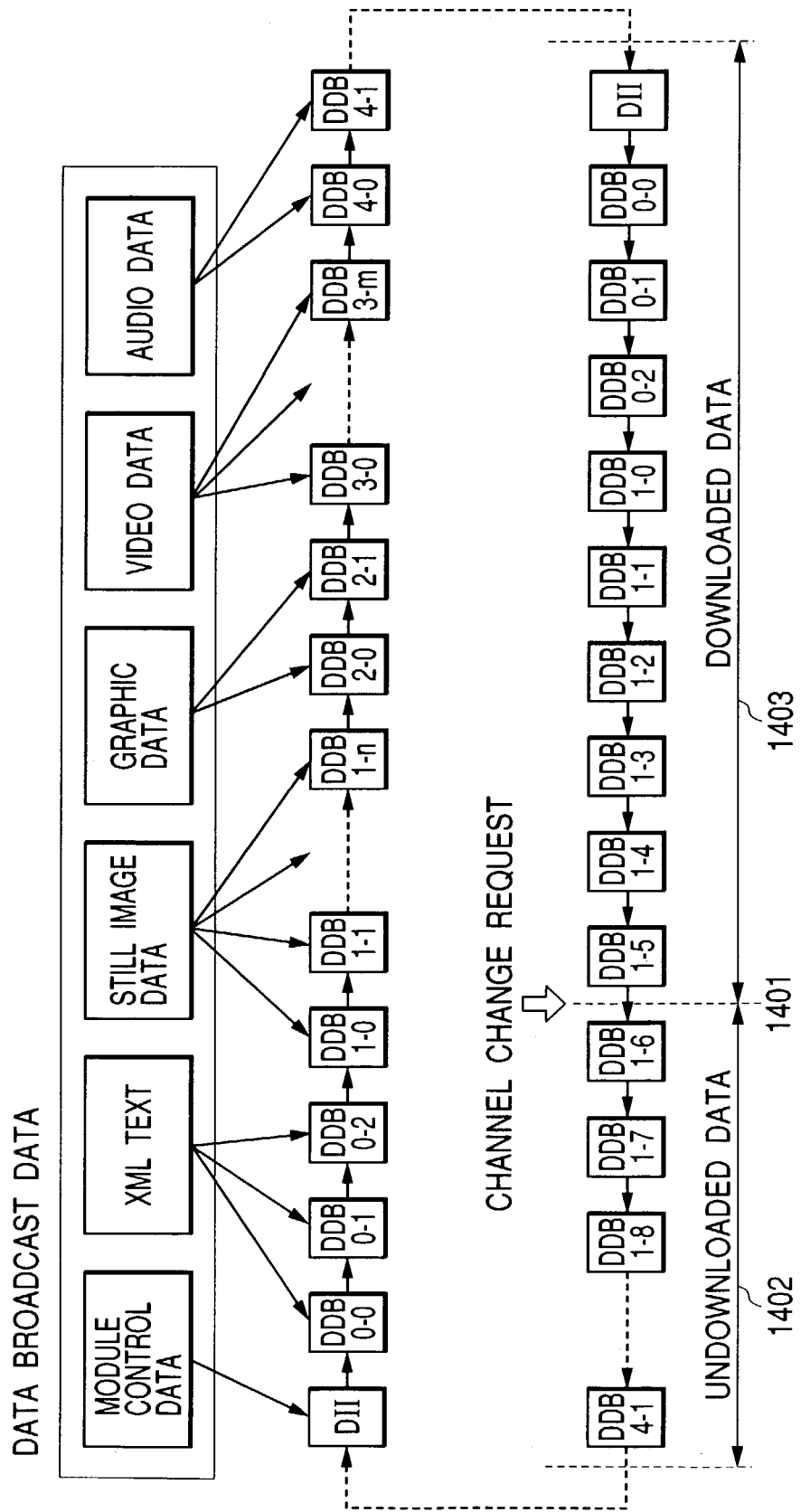
FIG. 14 illustrates a state of data broadcast data.

Like FIG. 4, FIG. 14 is a conceptual diagram of data broadcast data to be transmitted by the data carousel transmission system. In FIG. 14, in the case in which a channel change request is sent at a point denoted by 1401, DII, and DDB0-0 to DDB1-5 of a part 1403 indicated by "downloaded data" in FIG. 14 have been downloaded. The fact that these data have been already obtained means they are managed by the CPU 115 as described above.

Figure 15:
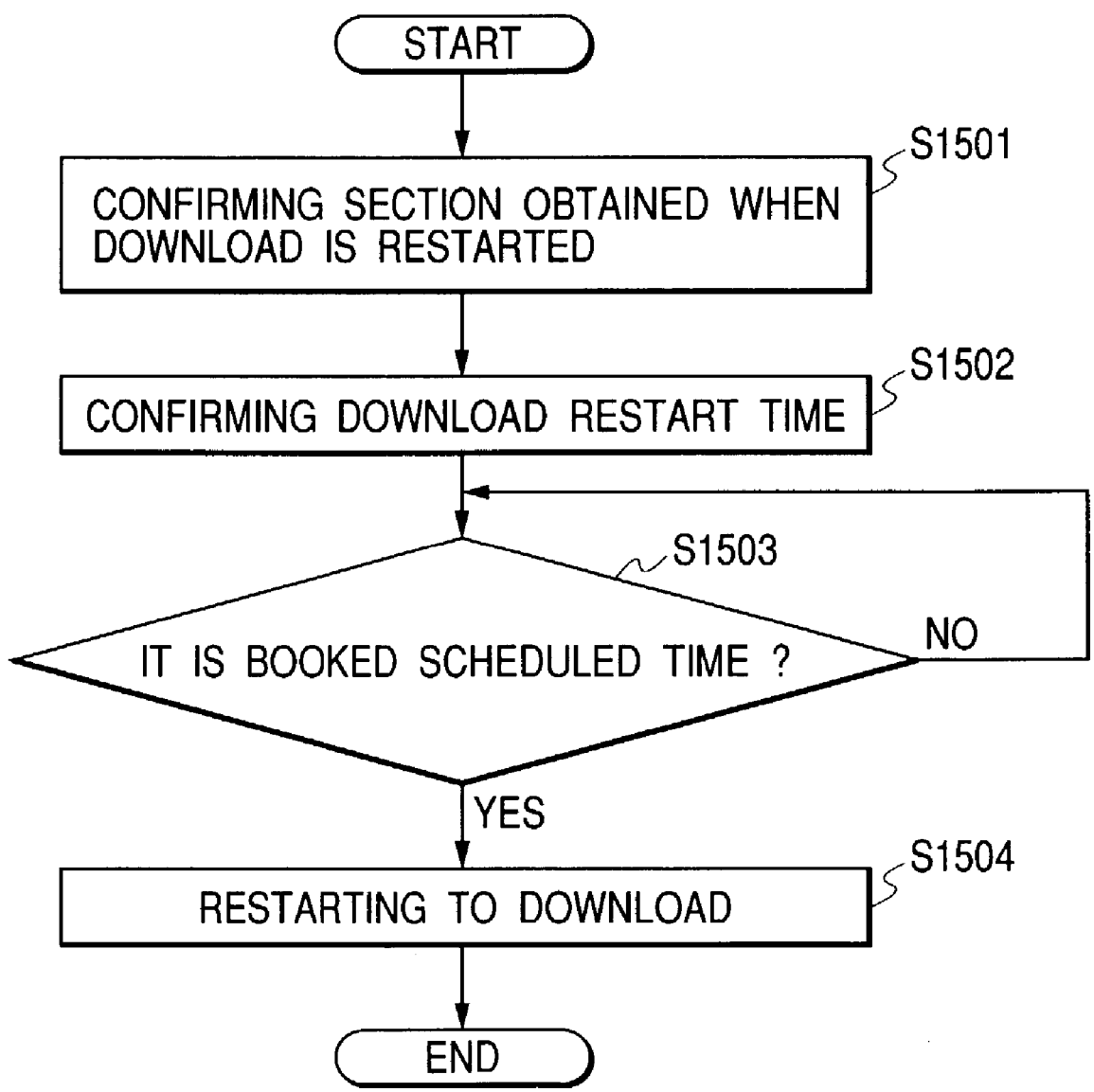
FIG. 15 is a flow chart explaining a booked downloading operation.

FIG. 15 is a flow chart showing a booking operation for restarting downloading by the CPU 115. In step S1501 of FIG. 15, the CPU 115 confirms this downloaded data.

Next, in step S1502, the CPU 115 confirms a download restart time. In the example of FIGS. 8A to 8C, the download restart time is the "time when the program 2 is scheduled to end" or the date and time when the start of retransmission is scheduled described in the area 1104 of FIG. 11.

Then, in step S1503, the CPU 115 waits for the booked scheduled time to come and, when the booked scheduled time has come, restarts downloading of data broadcast data which has not been downloaded yet in step S1504. More specifically, the CPU 115 controls the tuner 102 and the demultiplexer 103 when the booked scheduled time has come, receives the data broadcast data from a booked channel to output the data broadcast data to the storage unit 114, and starts downloading. In the example shown in FIG. 14, downloading of all the data broadcast data from DDB1-6 on is executed.

In this way, according to this embodiment, in the case in which a channel change instruction is sent during downloading of data broadcast data, the CPU 115 compares a broadcast ending time of data broadcast data which is being downloaded and an ending time of a program which is being broadcasted on a channel after-change. In the case in which downloading can be restarted after a program after-change ends, the CPU 115 performs channel change and, at the same time, automatically books restart of downloading.

Thus, the user can view a program which is being broadcasted on a desired channel without giving up downloading of data broadcast data which is now being downloaded.

In addition, even in the case in which broadcast of data broadcast data which is now being downloaded ends before a program to be broadcasted on a channel after-change ends, the CPU 115 confirms a retransmission schedule of this data broadcast data and automatically books restart of downloading. Thus, the user can view a program which is being broadcasted on a desired channel without giving up downloading of data broadcast data which is now being downloaded.

Moreover, even in the case in which downloading of data broadcast data which is being downloaded cannot be restarted, since the CPU 115 indicates to the effect that downloading of data broadcast data is suspended by channel change when the channel change takes place, the CPU 115 can prevent the user from changing a channel to another channel without remembering or recognizing that the data broadcast is being downloaded. Thus, the user can change a channel upon recognizing that the downloading of the data broadcast data is suspended.

Note that, although the case in which the present invention is applied to a BS digital broadcast receiver is described in the above-described embodiment, the present invention is not specifically limited to the BS digital broadcast. The present invention is also applicable to an apparatus having a function of receiving and downloading data broadcasted by a television broadcast, and has the same effect in such an apparatus as in the BS digital broadcast receiver.

In addition, information such as a broadcast time of a program before and after changing a channel and a rebroadcast schedule is detected from program guide information such as the EIT in the above-described embodiment. However, the present invention is not limited to this, and it is possible to obtain the information as additional information with another means.

Further, processing in accordance with a channel change instruction during downloading of data broadcast data is described in this embodiment. However, in addition to this, when channel change is instructed during viewing or recording of an ordinary television broadcast program, it is also possible to indicate whether or not channel change is performed by detecting whether or not rebroadcast of the program is scheduled, or to display an alert picture to that effect.

Processing operations of the CPU 115 of FIG. 1 in this case will be described using a flow chart of FIG. 16.

Figure 16:
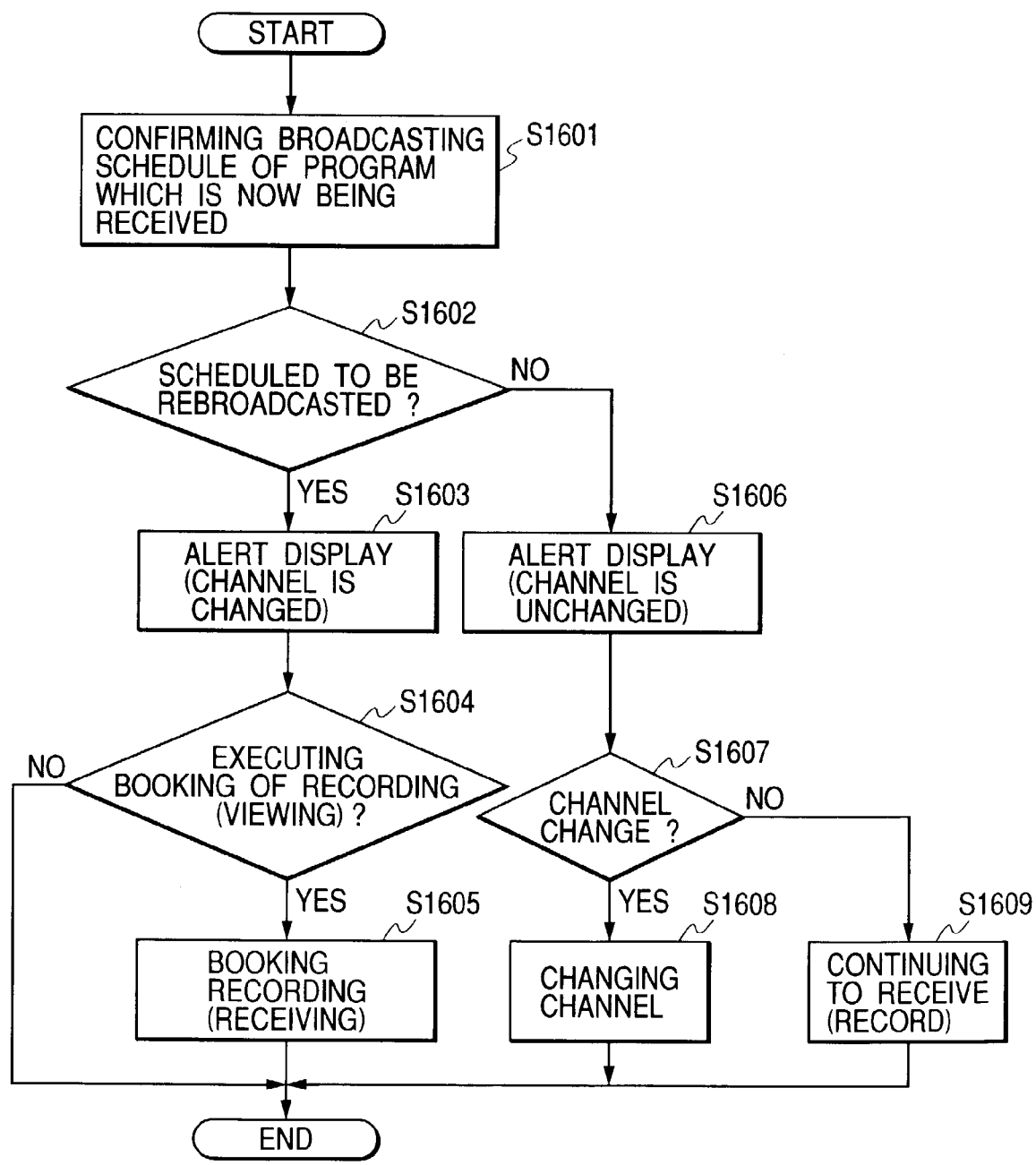
FIG. 16 is a flow chart explaining operations at the time when a channel is changed.

The processing shown in FIG. 16 is basically the same as the processing of step S707 and subsequent steps of FIG. 7. In the case in which, during viewing or recording of a program of a certain channel, an instruction to change to a channel included in a TS different from that certain channel is sent, the flow of FIG. 16 starts.

First, in step S1601, the CPU 115 confirms retransmission schedule information concerning a program which is now being received, which information is described in the area 1104 of FIG. 11, as mentioned above. Then, in step S1602, the CPU 115 confirms whether or not the program is scheduled to be rebroadcasted based on a result of confirmation of the rebroadcast schedule.

That is, the CPU 115 judges that the program is scheduled to be rebroadcasted if there is a description in the event information description area 1104 of FIG. 11 and that the program is not scheduled to be rebroadcasted if there is no description in the event information description area 1104. The CPU 115 proceeds to step S1603 if the program is scheduled to be retransmitted and proceeds to step S1606 if the program is not scheduled to be retransmitted.

In the case in which the CPU 115 judges that the program is scheduled to be retransmitted, in step S1603, the CPU 115 changes the program to a program of a channel designated by the user and, at the same time, displays a picture similar to the alert picture shown in FIG. 12 on the image display unit 111.

Then, in step S1604, the CPU 115 waits for the user's judgment on whether or not booking for restarting viewing or recording in accordance with the description of the event information description area 1104 is performed. The user can confirms the display screen and designate with the remote controller 117 whether or not booking for restarting viewing or recording is performed. In the case in which the booking for restarting viewing or recording is instructed, the CPU 115 proceeds to step S1605, and books restart of downloading to finish the channel change operation. In addition, in the case in which the booking for restarting viewing or recording is not instructed, the CPU 115 finishes the channel change operation without performing the booking for restarting viewing or recording.

In addition, in the case in which the CPU 115 judges in step S1602 that the program, which is now being received or recorded, is not scheduled to be retransmitted, in step S1606, the CPU 115 displays the same picture as the alert picture as shown in FIG. 13 on the image display unit 111 without changing a channel to that designated by the user.

Then, in step S1607, the CPU 115 waits for the user's instruction on whether or not channel change is performed. The user can confirm the displayed alert picture and designate with the remote controller 117 whether or not booking for restarting viewing or recording is performed. If the booking for restarting viewing or recording is performed by the user, the CPU 115 proceeds to step S1608 and changes a channel to finish the channel change operation. In addition, if the booking for restarting viewing or recording is not performed by the user, the CPU 115 continues viewing or recording of a program which is now being received without changing a channel and finishes the channel change operation.

In this way, in the case in which an instruction to change a channel is set during viewing or recording of a television broadcast program, the CPU 115 detects whether or not a program which is now being received is scheduled to be retransmitted, and in the case in which the program is scheduled to be retransmitted, the CPU 115 performs channel change and, at the same time, makes it possible to book viewing or recording of a program scheduled to be retransmitted with a simple operation. Thus, convenience of the user involved in the channel change can be improved.

Next, a second embodiment of the present invention will be described.

Figure 17:
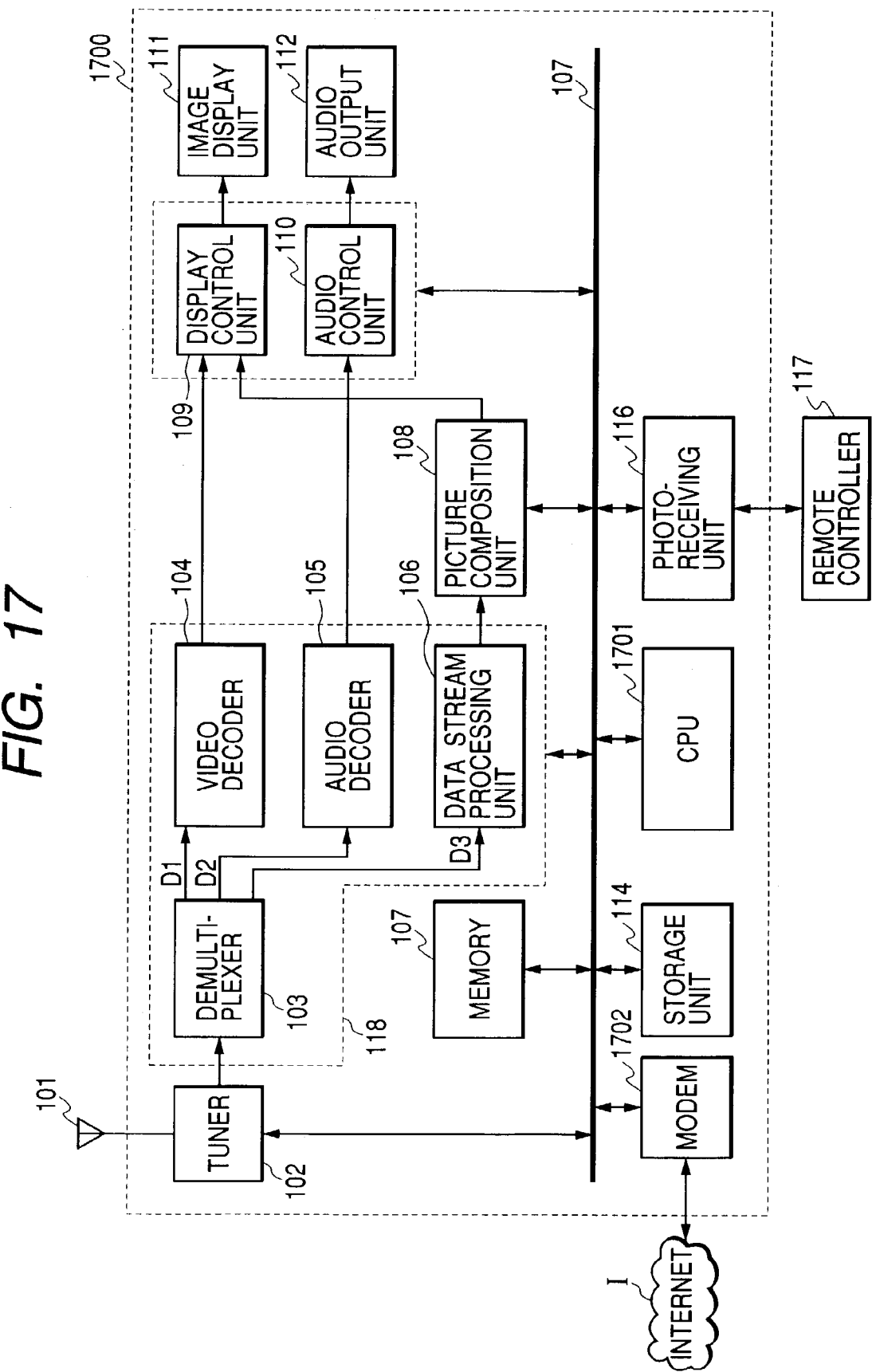
FIG. 17 is a block diagram showing a structure of a television receiver as a second embodiment of the present invention.

FIG. 17 is a block diagram showing a structure of a television receiver 1700 as the second embodiment of the present invention. In FIG. 17, the same components as those in FIG. 1 are denoted by the identical reference numerals, and detailed descriptions thereof will be omitted.

In the receiver 1700 of FIG. 17, reference numeral 1701 denotes a CPU and 1702 denotes a modem, and reference symbol I denotes the Internet. The CPU 1701 includes all the functions of the CPU 115 of FIG. 1 described above. Since the basic operations of the CPU 1701 such as the operation for receiving a broadcast wave with the antenna 101, the operation for displaying and outputting video, audio, and data broadcast data and the operation for downloading the data broadcast data are the same as those in the first embodiment, descriptions thereof will be omitted.

Figure 18:
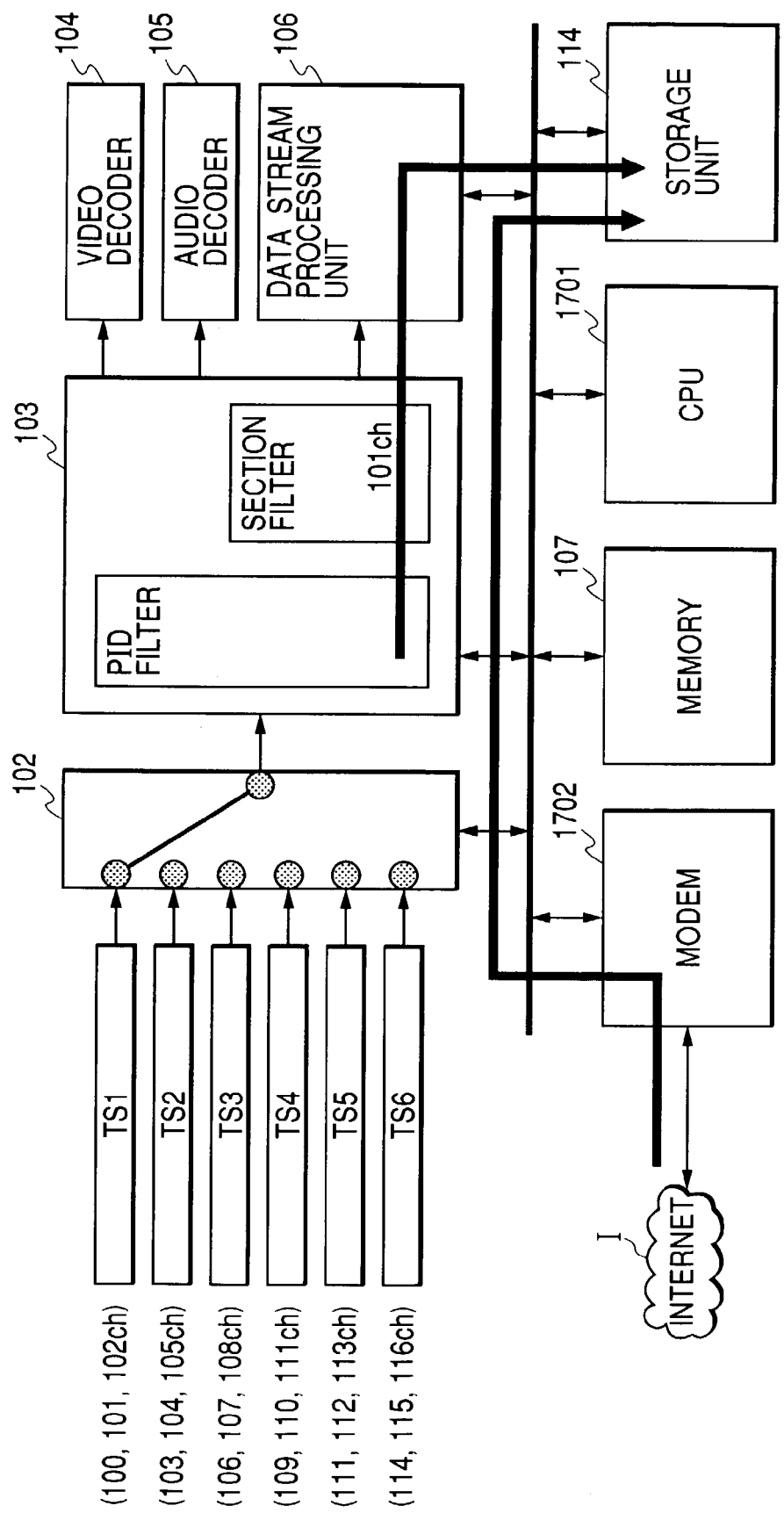
FIG. 18 illustrates an operation for receiving a digital television broadcast.

Operations in the case in which an instruction to change a channel is sent by a user during downloading of data broadcast data will be hereinafter described. FIG. 18 is a view showing a main part structure of the receiver 1700 for explaining operations according to the channel change instruction during downloading. In FIG. 18, the same components as those in FIG. 17 are denoted by the identical reference numerals.

In FIG. 18, six TSs are sent by television carrier waves of different frequencies, respectively, from a not-shown broadcasting station. These TSs are referred to as TS1 to TS6, respectively. As shown in the figure, data of 100ch, 101ch, and 102ch are multiplexed on the TS1, data of 103ch, 104ch, and 105ch are multiplexed on the TS2, and data of 106ch, 107ch, and 108ch are multiplexed on the TS3. In this way, television programs or data broadcast data for three channels are multiplexed on each TS up to the TS6 as shown in FIG. 6.

At present, the TS1 is being received in the tuner 102. Moreover, data broadcast data of 101ch is selected from the TS1 by the demultiplexer 103 and stored in the storage unit 114 via the data stream processing unit 106.

Further, the CPU 1701 stores and manages information of a DII and DDB modules which are now being downloaded and scheduled to be downloaded, in particular, a total amount of download data, the number of sections of the downloaded DDB and parameters module_id and section_no of the sections.

Figure 19:
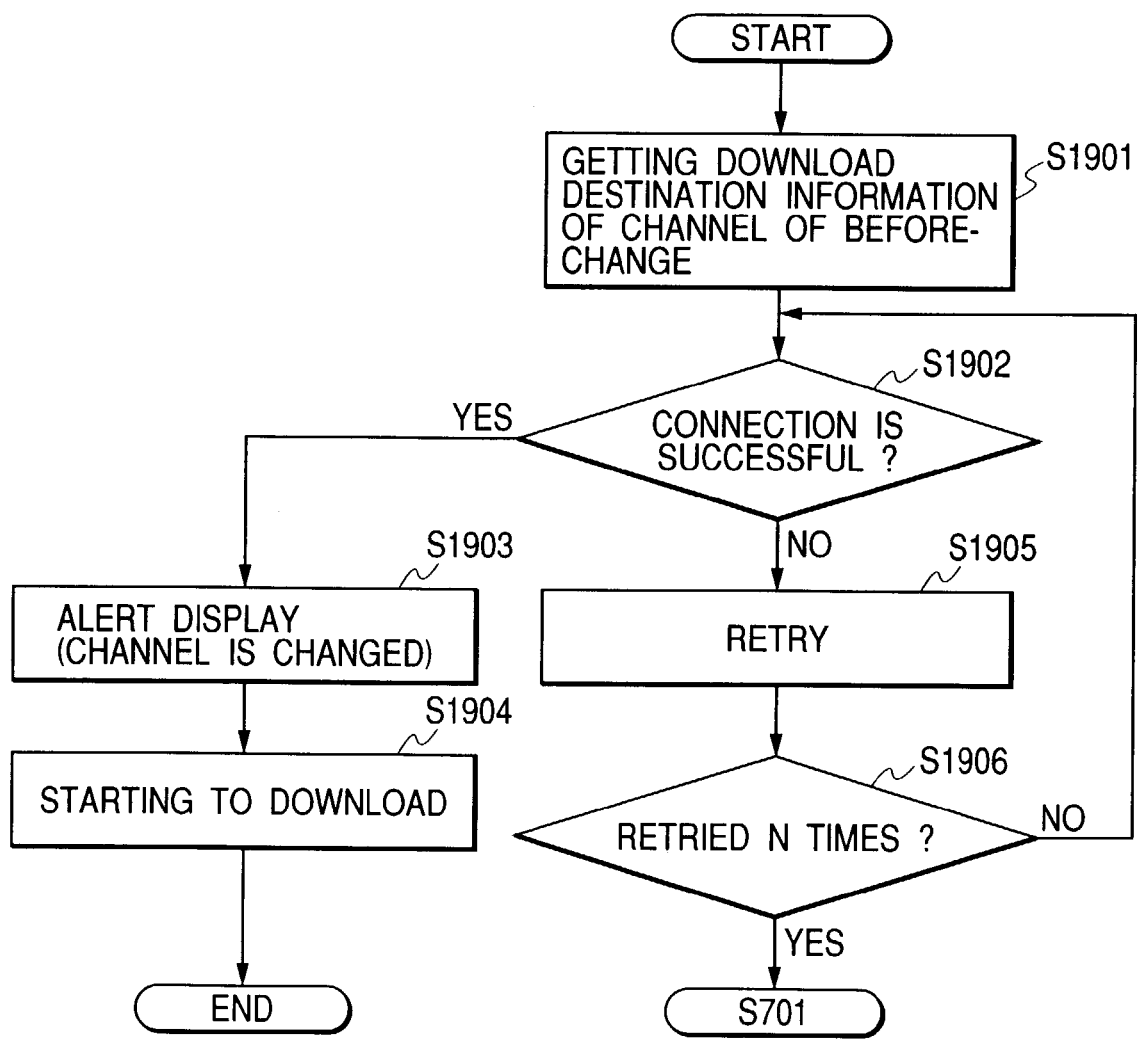
FIG. 19 is a flow chart explaining operations at the time when a channel is changed.

Next, operations of the CPU 1701 will be described which are performed in the case in which an instruction to change a channel to 106ch included in the TS3 is sent when data broadcast data which is being broadcasted on 101ch included in the TS1 is downloaded. FIG. 19 is a flow chart showing operations of the CPU 1701 in accordance with channel change.

In the case in which channel change is requested by a user operation, in step S1901, the CPU 1701 gets from the EIT stored in the memory 107 a Uniform Resource Locator (URL) serving as information of connection destination on the Internet I from which the data broadcast data which is being downloaded on the channel 101ch before-change, is provided.

Figure 20:
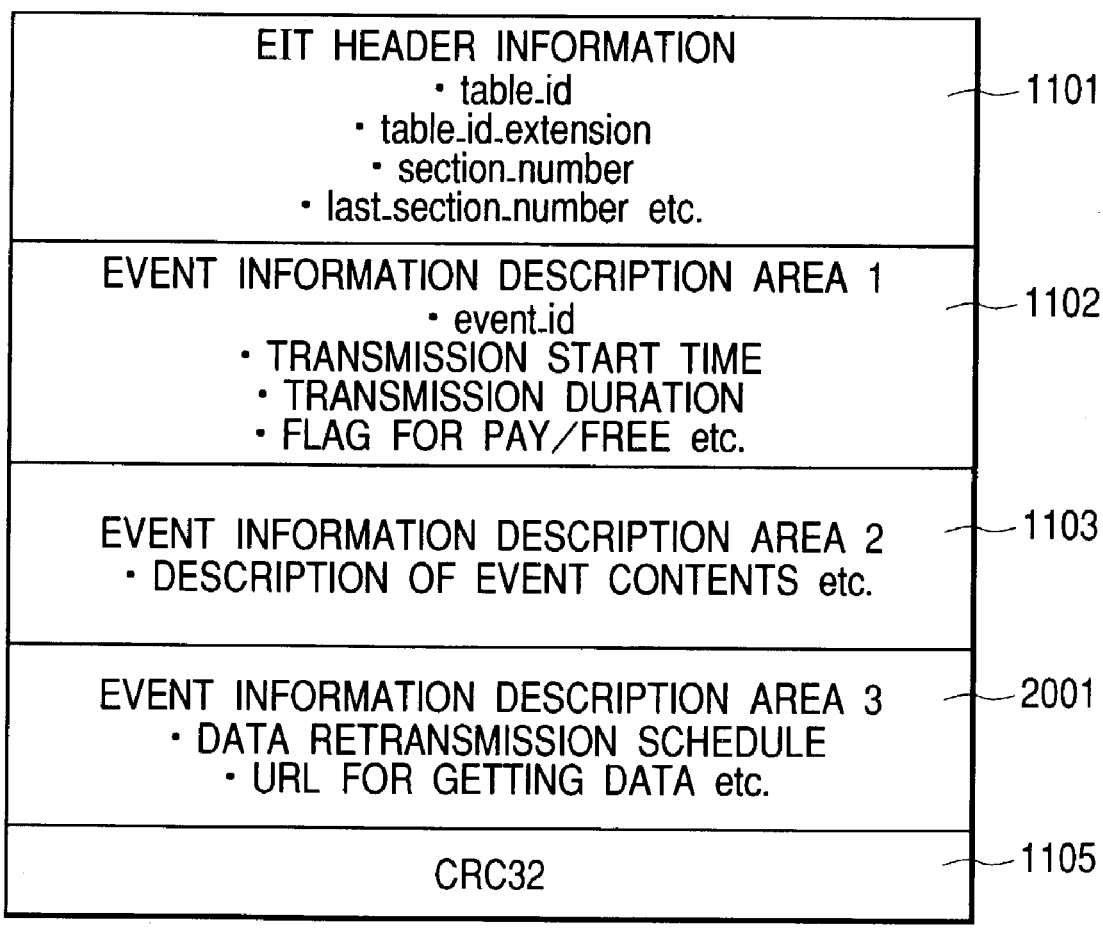
FIG. 20 illustrates a structure of EIT data in accordance with the second embodiment of the present invention.

FIG. 20 shows an example (extract) of a data structure of the EIT transmitting a URL in which broadcast data used in this embodiment exists.

In areas 1101 to 1103 and 1105 of FIG. 20, contents prescribed in the standard "Program Array Information to be used in Digital Broadcast", or the like in the ARIB are described, respectively. In an area 2001, retransmission schedule information and an URL for obtaining data of an event (data broadcast data) described in this EIT is described.

Figure 21:
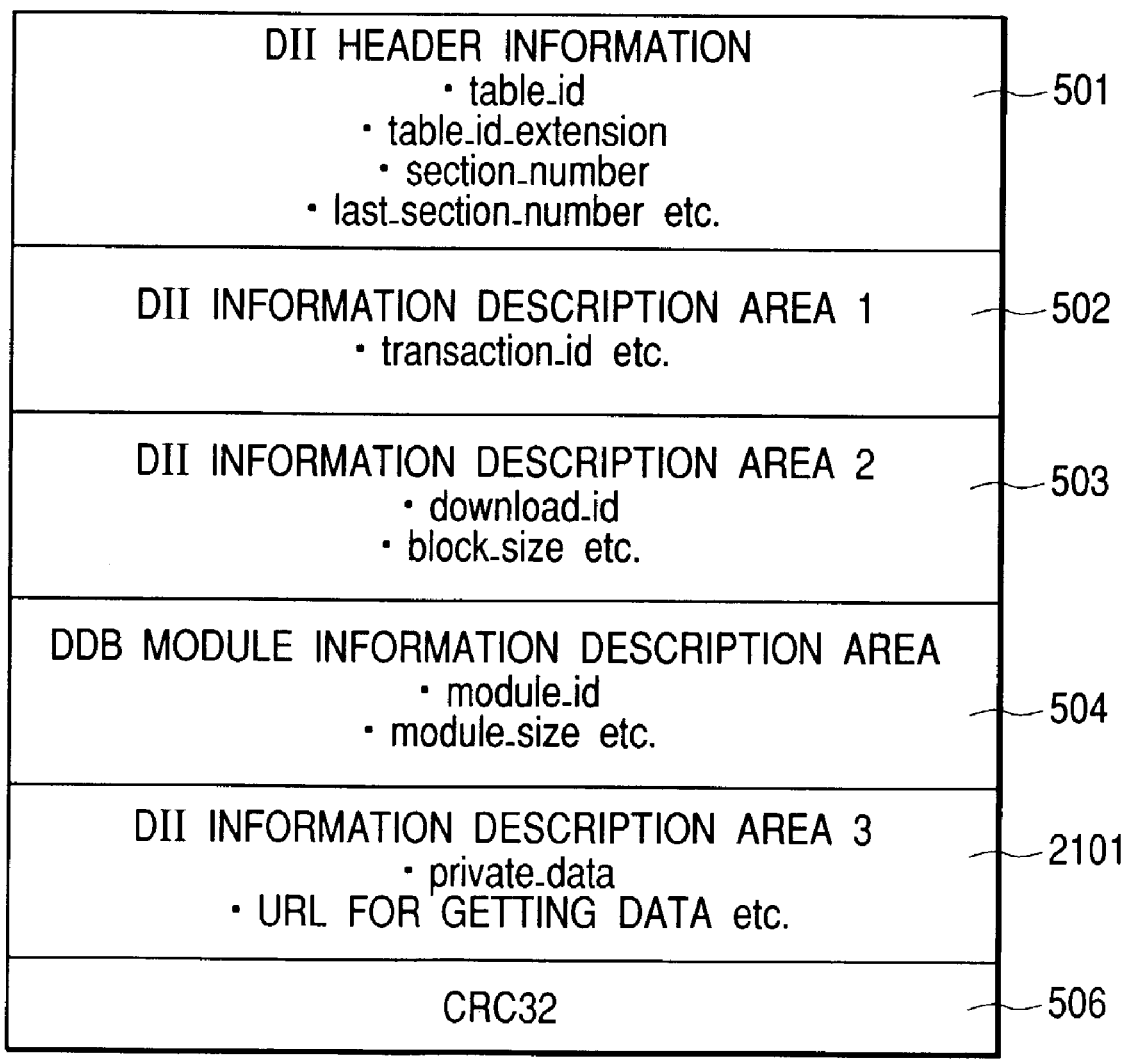
FIG. 21 illustrates a structure of EIT data in accordance with the second embodiment of the present invention.

Further, FIG. 21 shows an example (extract) of a data structure of the DII transmitting a URL in which broadcast data exists.

In FIG. 21, in the areas 501 to 504 and 506, contents prescribed and described in the technical material "BS Digital Broadcast Operation Regulations", or the like in the ARIB are described, respectively. In addition, in an area 2101, an URL for getting data which is now being downloaded is described. Further, if a DII has already been obtained at the point of step S1901, the same effect can be realized even if a URL described in the DII is used rather than the URL described in the EIT.

Next, in step S1902, the CPU 1701 attempts to make a connection to the Internet I via a modem 1702. If the connection is successful, the CPU 1701 proceeds to step S1903. If the connection is unsuccessful, the CPU 1701 proceeds to step S1805 to attempt retry of the connection. The CPU 1701 repeats steps S1902, S1905, and S1906 until the number of times of retry operations of the connection to the Internet I exceeds N. If the number of times of retry operations has exceeded N, the CPU 1701 shifts to the processing of step S701 and subsequent steps of FIG. 7 described in the first embodiment. In this embodiment, this number of times of retry is assumed to be ten.

Figure 22:
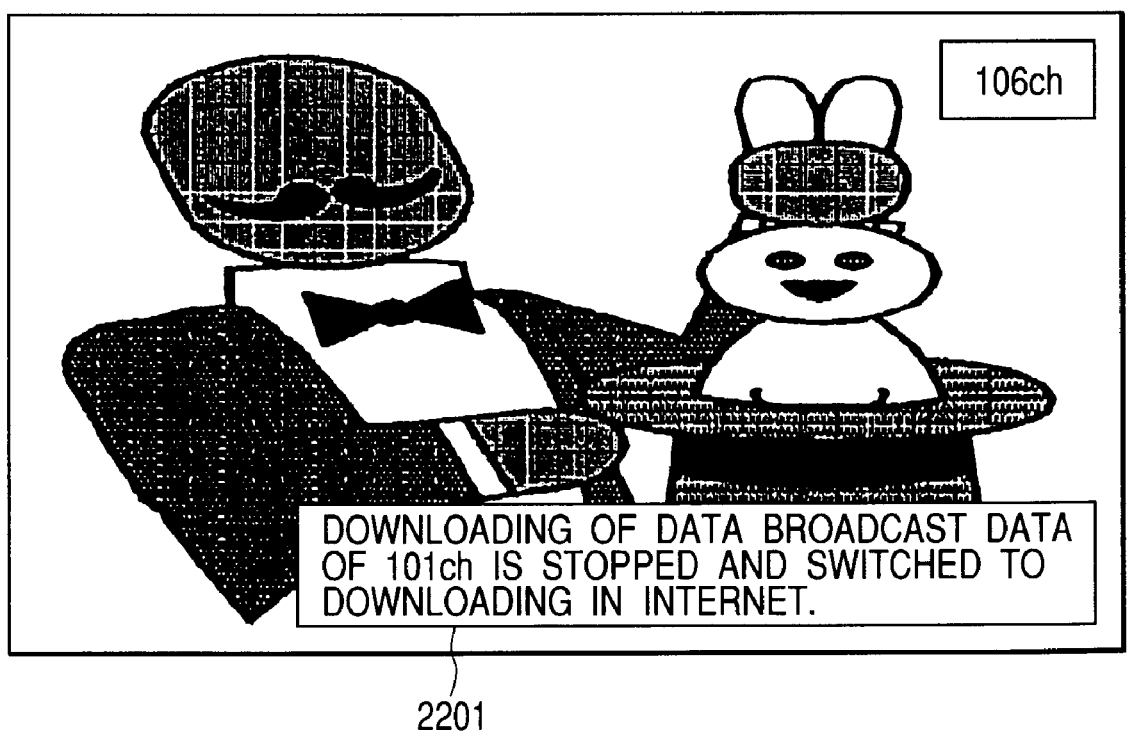
FIG. 22 illustrates an alert picture.

If the connection to the Internet I is successful in step S1902, the CPU 1701 changes the channel to 106ch desired by the user and, at the same time, displays an alert picture 2201 as shown in FIG. 22. Then, the CPU 1701 starts downloading from the Internet in step S1904 and finishes a series of operations.

In this case, as in the first embodiment, data which has already been downloaded may not be downloaded or may be downloaded again entirely. Naturally, downloading is finished earlier if the data which has already been downloaded is not to be downloaded.

In this way, according to this embodiment, when channel change is instructed during downloading of data broadcast data, the CPU 1701 detects on the Internet a program transmitting data which is being downloaded and, if there is a program transmitting data broadcast data which is being downloaded, the CPU 1701 performs downloading from the program on the Internet and, at the same time, performs channel change. Thus, the user can view a program which is being broadcasted on a desired channel without giving up downloading of data broadcast data which is now being downloaded.

Note that, in the above-described embodiment, the case is described in which data broadcast data broadcasted on a channel before-change exists on a designated URL on the Internet and the CPU performs downloading of the data broadcast data by making a connection to this URL. However, if data broadcast data can be obtained by a medium other than the Internet, for example, a disk medium such as a DVD or a CD, the present invention may be adapted such that information indicating a position where the data broadcast data exists is described in the EIT and, after a user is informed to the effect that data broadcast data which could not be downloaded can be obtained from the medium later, a channel is changed.

In addition, a storage medium such as a memory storing a program for realizing the functions in the above-described each embodiment by a CPU is also included in the present invention.

As described above, according to the present invention, even in the case in which channel change is instructed while television broadcast data is being received, it becomes possible to surely receive to record or download the data which is being received.

Many widely different embodiments of the present invention may be constructed without departing from the spirit and scope of the present invention. It should be understood that the present invention is not limited to the specific embodiments described in the specification, except as defined in the appended claims.

What is claimed is:

1. A signal receiving apparatus, comprising:
   receiving means for receiving a television broadcast;
   instruction means for instructing change of a receiving channel of said receiving means; and
   control means for, in response to the instruction of channel change by said instruction means, comparing an ending time of a program being broadcasted on a first channel which is currently being received by said receiving means and an ending time of a program broadcasted on a second channel after the channel change to control a channel change operation of said receiving means based on a result of the comparison.

2. An apparatus according to claim 1, wherein:
said control means changes the receiving channel to the second channel in the case in which the ending time of the program being broadcasted on the first channel is later than the ending time of the program being broadcasted on the second channel, and inhibits change to the second channel in the case in which the ending time of the program being broadcasted on the first channel is earlier than the ending time of the program being broadcasted on the second channel.

3. An apparatus according to claim 2, wherein
said control means further controls said receiving means to change the receiving channel to the first channel after the program being broadcasted on the second channel ends.

4. An apparatus according to claim 2, wherein
said control means further detects whether the program being broadcasted on the first channel is rebroadcasted in the case in which the ending time of the program being broadcasted on the first channel is earlier than the ending time of the program being broadcasted on the second channel and, changes the receiving channel to the second channel in the case in which the program being broadcasted on the first channel is rebroadcasted, and inhibits change to the second channel in the case in which the program being broadcasted on the first channel is not rebroadcasted.

5. An apparatus according to claim 1, wherein
said control means changes the receiving channel to the second channel in the case in which the ending time of the program being broadcasted on the first channel is later than the ending time of the program being broadcasted on the second channel by a predetermined time or more.

6. An apparatus according to claim 5, wherein
broadcast data of identical contents is repeatedly broadcasted at a period of the predetermined time in the program being broadcasted on the first channel.

7. An apparatus according to claim 1, further comprising:
storing means for storing television broadcast data received by said receiving means,
wherein said control means further controls a storing operation of said storing means.

8. An apparatus according to claim 7, wherein
said control means changes the receiving channel to the second channel and, at the same time, stops the storing operation of broadcast data of the first channel by said storing means in the case in which the ending time of the program being broadcasted on the first channel is later than the ending time of the program being broadcasted on the second channel.

9. An apparatus according to claim 8, wherein
said control means further controls said receiving means to change the receiving channel to the first channel again after the program being broadcasted on the second channel ends and, at the same time, starts storage of broadcast data of the first channel by said storing means.

10. An apparatus according to claim 9, wherein said control means determines broadcast data of the first channel which should be stored after the change from the second channel to the first channel, based on a state of the broadcast data which is stored in said storing means before the change of the receiving channel to the second channel.

11. An apparatus according to claim 7, wherein
said control means inhibits change to the second channel and, at the same time, continues the storing operation of broadcast data of the first channel by said storing means in the case in which the ending time of the program being broadcasted on the first channel is earlier than the ending time of the program being broadcasted on the second channel.

12. An apparatus according to claim 1, wherein
said control means detects the ending time based on program guide information to be transmitted by the television broadcast.

13. An apparatus according to claim 1, wherein
broadcast data of a plurality of channels are multiplexed by a unit of packet in one broadcast data stream of the television broadcast, and the first channel and the second channel are multiplexed in streams different from each other.

14. An apparatus according to claim 13, wherein
said control means detects the ending time based on program guide information included in a predetermined packet.

15. An apparatus according to claim 1, further comprising:
display means for displaying an image according to television broadcast data received by said receiving means,
wherein said control means further displays on said display means a predetermined display screen according to a result of the comparison.

16. A signal receiving apparatus comprising:
receiving means for receiving a television broadcast;
an operation unit having instruction means for instruction means for instructing a change of a receiving channel of said receiving means; and
control means for controlling whether or not to change a first channel to a second channel, based on time information concerning a program being broadcasted on the first channel before a change instructed by said instruction means, and based on time information concerning a program being broadcasted on the second channel after a change instructed by said instruction means,
wherein said control means changes the receiving channel to the second channel in the case in which the ending time of the program being broadcasted on the first channel is later than the ending time of the program being broadcasted on the second channel.

17. An apparatus according to claim 16, wherein:
said control means changes the receiving channel to the second channel in the case in which the ending time of the program being broadcasted on the first channel is later than the ending time of the program being broadcasted on the second channel and in the case in which said operation unit performs a predetermined operation, and inhibits change to the second channel in the case in which said operation unit does not perform a predetermined operation.

18. A signal receiving method, comprising the steps of:
receiving a television broadcast;
instructing change of a receiving channel of said receiving step; and
comparing in response to the instruction of receiving channel change, an ending time of a program being broadcasted on a first channel which is being received in said receiving step and an ending time of a program being broadcasted on a second channel after the change to control a receiving channel change operation based on a result of the comparison.

19. A storage medium for storing a program for executing the method according to claim 18 by a computer.

* * * * *

UNITED STATES PATENT AND TRADEMARK OFFICE
CERTIFICATE OF CORRECTION

PATENT NO.       : 7,316,026 B2
APPLICATION NO.  : 10/355105
DATED            : January 1, 2008
INVENTOR(S)      : Tomotoshi Kanatsu It is certified that error appears in the above-identified patent and that said Letters Patent is hereby corrected as shown below:

SHEET 10:

Figure 10, "TEMPORARY" should read --TEMPORARILY--.

SHEET 12:

Figure 12, "TEMPORARY" should read --TEMPORARILY--.

COLUMN 6:

Line 20, "time Ti" should read --time T1--.

COLUMN 10:

Line 5, "confirms" should read --confirm--.

COLUMN 14:

Line 29, "means for instruction" should be deleted.

Signed and Sealed this

Second Day of September, 2008

JON W. DUDAS
*Director of the United States Patent and Trademark Office*